(12) United States Patent
Papasakellariou

(10) Patent No.: US 9,210,670 B2
(45) Date of Patent: Dec. 8, 2015

(54) UPLINK POWER CONTROL IN ADAPTIVELY CONFIGURED TDD COMMUNICATION SYSTEMS

(71) Applicant: Samsung Electronics Co., Ltd., Suwon-si, Gyeonggi-do (KR)

(72) Inventor: Aris Papasakellariou, Houston, TX (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 79 days.

(21) Appl. No.: 14/206,929

(22) Filed: Mar. 12, 2014

(65) Prior Publication Data

US 2014/0269454 A1    Sep. 18, 2014

Related U.S. Application Data

(60) Provisional application No. 61/802,970, filed on Mar. 18, 2013, provisional application No. 61/908,537, filed on Nov. 25, 2013, provisional application No. 61/910,006, filed on Nov. 27, 2013.

(51) Int. Cl.
| | |
|---|---|
| *H04W 52/34* | (2009.01) |
| *H04L 5/14* | (2006.01) |
| *H04L 5/00* | (2006.01) |
| *H04W 52/14* | (2009.01) |
| *H04W 52/32* | (2009.01) |

(52) U.S. Cl.
CPC ............. *H04W 52/34* (2013.01); *H04L 5/0092* (2013.01); *H04L 5/14* (2013.01); *H04W 52/146* (2013.01); *H04W 52/325* (2013.01)

(58) Field of Classification Search
None
See application file for complete search history.

(56) References Cited

U.S. PATENT DOCUMENTS

| | | | |
|---|---|---|---|
| 2011/0319121 A1 | 12/2011 | Jen | |
| 2012/0106407 A1 | 5/2012 | Papasakellariou et al. | |
| 2012/0213189 A1 | 8/2012 | Choi et al. | |
| 2013/0029657 A1 | 1/2013 | Gao et al. | |
| 2013/0336150 A1* | 12/2013 | Abe et al. | 370/252 |
| 2014/0016596 A1* | 1/2014 | Kim et al. | 370/329 |
| 2014/0050191 A1* | 2/2014 | Kim et al. | 370/329 |
| 2014/0133388 A1* | 5/2014 | Wager et al. | 370/315 |
| 2014/0269453 A1* | 9/2014 | Papasakellariou | 370/280 |

OTHER PUBLICATIONS

International Search Report dated Jun. 27, 2014 in connection with International Patent Application No. PCT/KR2014/002242, 4 pages.
Written Opinion of International Searching Authority dated Jun. 27, 2014 in connection with International Patent Application No. PCT/KR2014/002242, 7 pages.

* cited by examiner

*Primary Examiner* — Brandon Renner

(57) ABSTRACT

Methods and apparatus of a base station or a User Equipment (UE) in communication with each other are provided. The UE is configured by the base station for operation with an adapted Time Division Duplex (TDD) UpLink-DownLink (UL-DL) configuration. A process enabling UL power control for transmissions of various channels or signals from the UE in two different sets of UL Transmission Time Intervals (TTIs) and a process enabling receptions of data transport blocks by the base station in two different sets of UL TTIs are provided.

15 Claims, 10 Drawing Sheets

UPLINK POWER CONTROL IN ADAPTIVELY CONFIGURED TDD COMMUNICATION SYSTEMS

CROSS-REFERENCE TO RELATED APPLICATION AND CLAIM OF PRIORITY

The present application claims priority under 35 U.S.C. §119(e) to U.S. Provisional Patent Application Ser. No. 61/802,970 filed Mar. 18, 2013, entitled "Power Control in Adaptively Configured TDD Communication Systems," U.S. Provisional Patent Application Ser. No. 61/908,537 filed Nov. 25, 2013, entitled "Power Control in Adaptively Configured TDD Communication Systems," and U.S. Provisional Patent Application Ser. No. 61/910,006 filed Nov. 27, 2013, entitled "Power Control in Adaptively Configured TDD Communication Systems." The above-identified provisional patent applications are hereby incorporated by reference in their entirety.

TECHNICAL FIELD

The present application relates generally to wireless communications and, more specifically, to power control of transmissions from a user equipment and to receptions from a base station in adaptively configured time division duplex (TDD) communication systems.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, and eBook readers. In order to meet the high growth in mobile data traffic, improvements in radio interface efficiency and allocation of new spectrum is of paramount importance.

SUMMARY

This disclosure provides power control for transmissions from a user equipment in adaptively configured time division duplex (TDD) communication systems.

In a first embodiment, a method is provided. The method includes transmitting, by a base station to a User Equipment (UE), first signaling indicating a first Time Division Duplexing (TDD) UpLink-DownLink (UL-DL) configuration from a set of TDD UL-DL configurations. A TDD UL-DL configuration is defined over a time period of ten SubFrames (SFs) that comprise DL SFs where a communication direction is from the base station to the UE, UL SFs where a communication direction is from the UE to the base station, and special SFs where a communication direction can be both from the base station to the UE and from the UE to the base station. Each SF of the ten SFs has a unique time domain index. The method also includes a transmitter configured to transmit, to the UE, first configuration information for communication using adapted TDD UL-DL configurations. A valid adapted TDD UL-DL configuration is from a subset of the set of TDD UL-DL configurations. A number of UL or special SFs in the first TDD UL-DL configuration are DL SFs in the adapted TDD UL-DL configuration and at least one UL SF in the first TDD UL-DL configuration remains UL SF in any TDD UL-DL configuration from the subset of the set of TDD UL-DL configurations. The method further includes transmitting, by the base station to the UE, second configuration information for a first set of parameters associated with a first UL Power Control (PC) process, a second set of parameters associated with a second UL PC process, and a bit-map defining a one-to-one mapping between a subset of predetermined SFs, in any TDD UL-DL configuration from the set of TDD UL-DL configurations, and a first set of SFs and a second set of SFs. A binary value of '0' associates a SF with the first set of SFs and a binary value of '1' associates a SF with the second set of SFs. The first set of SFs includes all SFs that are UL SFs in every TDD UL-DL configuration from the subset of the set of TDD UL-DL configurations and the second set of SFs includes at least one SF that is a DL SF in at least one TDD UL-DL configuration from the subset of the set of TDD UL-DL configurations. The method additionally includes transmitting, by the base station to the UE, second signaling indicating the UE to transmit a Physical UL Shared CHannel (PUSCH) or a Sounding Reference Signal (SRS) in an UL SF of the adapted TDD UL-DL configuration. In response to receiving, by the UE, the first signaling, the first configuration information, the second configuration information, and the second signaling, the UE transmits the PUSCH or SRS in the UL SF with a power determined according to the first UL PC process if the UL SF is in the first set of SFs or with a power determined according to the second UL PC process if the UL SF is in the second set of SFs.

In a second embodiment, a method is provided. The method includes receiving, by a base station from a User Equipment (UE) a first Physical Uplink Shared CHannel (PUSCH) conveying an initial transmission of a data information Transport Block (TB) and a second PUSCH conveying a retransmission of the data information TB. The method also includes combining, by the base station, for a same data information a first demodulated value in the first PUSCH and a second demodulated value in the second PUSCH after scaling the second demodulated value with a factor. The method further includes decoding, by the base station, the data information TB.

In a third embodiment, a base station is provided. The base station includes a transmitter configured to transmit, to a User Equipment (UE), first signaling indicating a first Time Division Duplexing (TDD) UpLink-DownLink (UL-DL) configuration from a set of TDD UL-DL configurations. A TDD UL-DL configuration is defined over a time period of ten SubFrames (SFs) that comprise DL SFs where a communication direction is from the base station to the UE, UL SFs where a communication direction is from the UE to the base station, and special SFs where a communication direction can be both from the base station to the UE and from the UE to the base station. Each SF of the ten SFs has a unique time domain index. The base station also includes a transmitter configured to transmit, to the UE, first configuration information for communication using adapted TDD UL-DL configurations. A valid adapted TDD UL-DL configuration is from a subset of the set of TDD UL-DL configurations. A number of UL or special SFs in the first TDD UL-DL configuration are DL SFs in the adapted TDD UL-DL configuration and at least one UL SF in the first TDD UL-DL configuration remains UL SF in any TDD UL-DL configuration from the subset of the set of TDD UL-DL configurations. The base station further includes a transmitter configured to transmit, to the UE, second configuration information for a first set of parameters associated with a first UL Power Control (PC) process, a second set of parameters associated with a second UL PC process, and a bit-map defining a one-to-one mapping between a subset of predetermined SFs, in any TDD UL-DL configuration from the set of TDD UL-DL configurations, and a first set of SFs and a second set of SFs. A binary value of '0' associates a SF with the first set of SFs and a binary value of '1' associates a SF with the second set of SFs. The first set of SFs includes all SFs that are UL SFs in every TDD UL-DL configuration from the subset of the set of TDD UL-DL configurations and the second set of SFs includes at least one SF that is a DL SF in at least one TDD UL-DL configuration from the subset of the set of TDD UL-DL configurations. The base station additionally includes a transmitter configured to transmit, to the UE, second signaling indicating the UE to transmit a Physical UL Shared CHannel (PUSCH) or a Sounding Reference Signal (SRS) in an UL SF of the adapted TDD UL-DL configuration. The base station further includes a receiver configured to receive, from the UE, the PUSCH or SRS in the UL SF with a power determined according to the first UL PC process if the UL SF is in the first set of SFs or with a power determined according to the second UL PC process if the UL SF is in the second set of SFs.

In a fourth embodiment, a User Equipment (UE) is provided. The UE includes a receiver configured to receive, from a base station, first signaling indicating a first Time Division Duplexing (TDD) UpLink-DownLink (UL-DL) configuration from a set of TDD UL-DL configurations. A TDD UL-DL configuration is defined over a time period of ten Sub-Frames (SFs) that comprise DL SFs where a communication direction is from the base station to the UE, UL SFs where a communication direction is from the UE to the base station, and special SFs where a communication direction can be both from the base station to the UE and from the UE to the base station. Each SF of the ten SFs has a unique time domain index. The UE also includes a receiver configured to receive, from a base station, first configuration information for communication using adapted TDD UL-DL configurations. A valid adapted TDD UL-DL configuration is from a subset of the set of TDD UL-DL configurations. A number of UL or special SFs in the first TDD UL-DL configuration are DL SFs in the adapted TDD UL-DL configuration and at least one UL SF in the first TDD UL-DL configuration remains UL SF in any TDD UL-DL configuration from the subset of the set of TDD UL-DL configurations. The UE further includes a receiver configured to receive, from a base station, second configuration information for a first set of parameters associated with a first UL Power Control (PC) process, a second set of parameters associated with a second UL PC process, and a bit-map defining a one-to-one mapping between a subset of predetermined SFs, in any TDD UL-DL configuration from the set of TDD UL-DL configurations, and a first set of SFs and a second set of SFs. A binary value of '0' associates a SF with the first set of SFs and a binary value of '1' associates a SF with the second set of SFs. The first set of SFs includes all SFs that are UL SFs in every TDD UL-DL configuration from the subset of the set of TDD UL-DL configurations and the second set of SFs includes at least one SF that is a DL SF in at least one TDD UL-DL configuration from the subset of the set of TDD UL-DL configurations. The UE additionally includes a receiver configured to receive, from a base station, second signaling indicating the UE to transmit a Physical UL Shared CHannel (PUSCH) or a Sounding Reference Signal (SRS) in an UL SF of the adapted TDD UL-DL configuration. The UE also includes a transmitter configured to transmit, to the base station, the PUSCH or the SRS in the UL SF with a power determined according to the first UL PC process if the UL SF is in the first set of SFs or with a power determined according to the second UL PC process if the UL SF is in the second set of SFs.

In a fifth embodiment, a base station is provided. The base station includes a receiver configured to receive, from a User Equipment (UE), a first Physical Uplink Shared CHannel (PUSCH) conveying an initial transmission of a data information Transport Block (TB) and a second PUSCH conveying a retransmission of the data information TB. The base station also includes a combiner configured to combine, for a same data information, a first demodulated value in the first PUSCH and a second demodulated value in the second PUSCH after scaling the second demodulated value with a factor. The base station further includes a decoder configured to decode the data information TB.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: 3GPP TS 36.211 v11.1.0, "E-UTRA, Physical channels and modulation" (REF 1); 3GPP TS 36.212 v11.1.0, "E-UTRA, Multiplexing and Channel coding" (REF 2); 3GPP TS 36.213 v11.1.0, "E-UTRA, Physical Layer Procedures" (REF 3); and 3GPP TS 36.331 v11.1.0, "E-UTRA, Radio Resource Control (RRC) Protocol Specification." (REF 4).

This disclosure relates to the adaptation of communication direction in wireless communication networks that utilize Time Division Duplex (TDD). A wireless communication network includes a DownLink (DL) that conveys signals from transmission points (such as base stations or eNodeBs) to user equipments (UEs). The wireless communication network also includes an UpLink (UL) that conveys signals from UEs to reception points such as eNodeBs.

Figure 1:
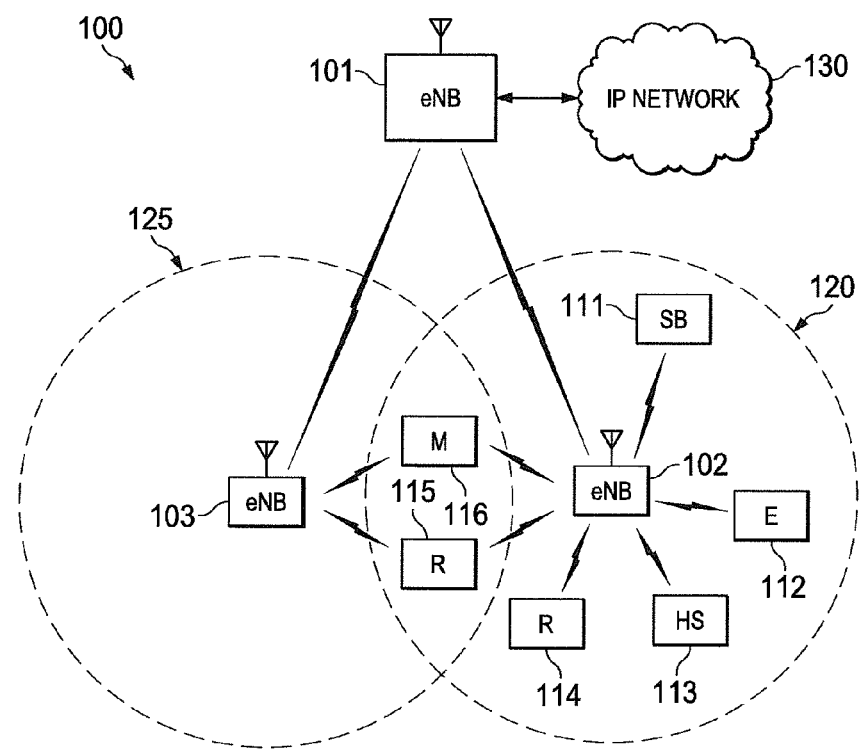
FIG. 1 illustrates an example wireless communication network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, various components of the network 100 (such as the eNBs 101-103 and/or the UEs 111-116) support uplink power control in the network 100, which can utilize TDD.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
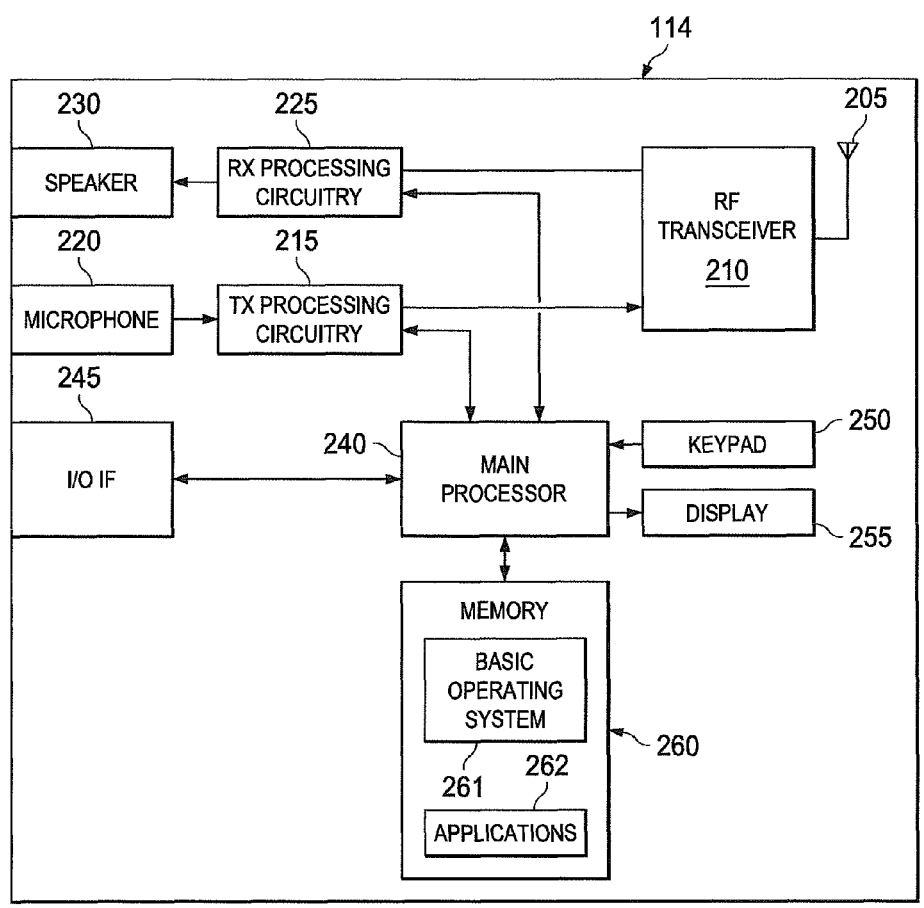
FIG. 2 illustrates an example user equipment (UE) according to this disclosure.

FIG. 2 illustrates an example UE 114 according to this disclosure. The embodiment of the UE 114 shown in FIG. 2 is for illustration only, and the other UEs in FIG. 1 could have the same or similar configuration. However, UEs come in a wide variety of configurations, and FIG. 2 does not limit the scope of this disclosure to any particular implementation of a UE.

As shown in FIG. 2, the UE 114 includes an antenna 205, a radio frequency (RF) transceiver 210, transmit (TX) processing circuitry 215, a microphone 220, and receive (RX) processing circuitry 225. The UE 114 also includes a speaker 230, a main processor 240, an input/output (I/O) interface (IF) 245, a keypad 250, a display 255, and a memory 260. The memory 260 includes a basic operating system (OS) program 261 and one or more applications 262.

The RF transceiver 210 receives, from the antenna 205, an incoming RF signal transmitted by an eNB or another UE. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the main processor 240 for further processing (such as for web browsing data).

The TX processing circuitry 215 receives analog or digital voice data from the microphone 220 or other outgoing baseband data (such as web data, e-mail, or interactive video game data) from the main processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The main processor 240 can include one or more processors or other processing devices and can execute the basic OS program 261 stored in the memory 260 in order to control the overall operation of the UE 114. For example, the main processor 240 could control the reception of forward channel signals and the transmission of reverse channel signals by the RF transceiver 210, the RX processing circuitry 225, and the TX processing circuitry 215 in accordance with well-known principles. In some embodiments, the main processor 240 includes at least one microprocessor or microcontroller.

The main processor 240 is also capable of executing other processes and programs resident in the memory 260. The main processor 240 can move data into or out of the memory 260 as required by an executing process such as operations supporting uplink power control in adaptively configured time division duplex (TDD) communication systems. In some embodiments, the main processor 240 is configured to execute the applications 262 based on the OS program 261 or in response to signals received from eNBs, other UEs, or an operator. The main processor 240 is also coupled to the I/O interface 245, which provides the UE 114 with the ability to connect to other devices such as laptop computers and handheld computers. The I/O interface 245 is the communication path between these accessories and the main processor 240.

The main processor 240 is also coupled to the keypad 250 and the display unit 255. The operator of the UE 114 can use the keypad 250 to enter data into the UE 114. The display 255 may be a liquid crystal display or other display capable of rendering text and/or at least limited graphics, such as from web sites. The display 255 could also represent a touchscreen.

The memory 260 is coupled to the main processor 240. Part of the memory 260 could include a random access memory (RAM), and another part of the memory 260 could include a Flash memory or other read-only memory (ROM).

As described in more detail below, the transmit and receive paths of the UE 114 (implemented using the RF transceiver 210, TX processing circuitry 215, and/or RX processing circuitry 225) support downlink signaling for uplink and downlink adaptation in adaptively configured TDD systems.

Although FIG. 2 illustrates one example of UE 114, various changes may be made to FIG. 2. For example, various components in FIG. 2 could be combined, further subdivided, or omitted and additional components could be added according to particular needs. As a particular example, the main processor 240 could be divided into multiple processors, such as one or more central processing units (CPUs) and one or more graphics processing units (GPUs). Also, while FIG. 2 illustrates the UE 114 configured as a mobile telephone or smartphone, UEs could be configured to operate as other types of mobile or stationary devices. In addition, various components in FIG. 2 could be replicated, such as when different RF components are used to communicate with the eNBs 101-103 and with other UEs.

Figure 3:
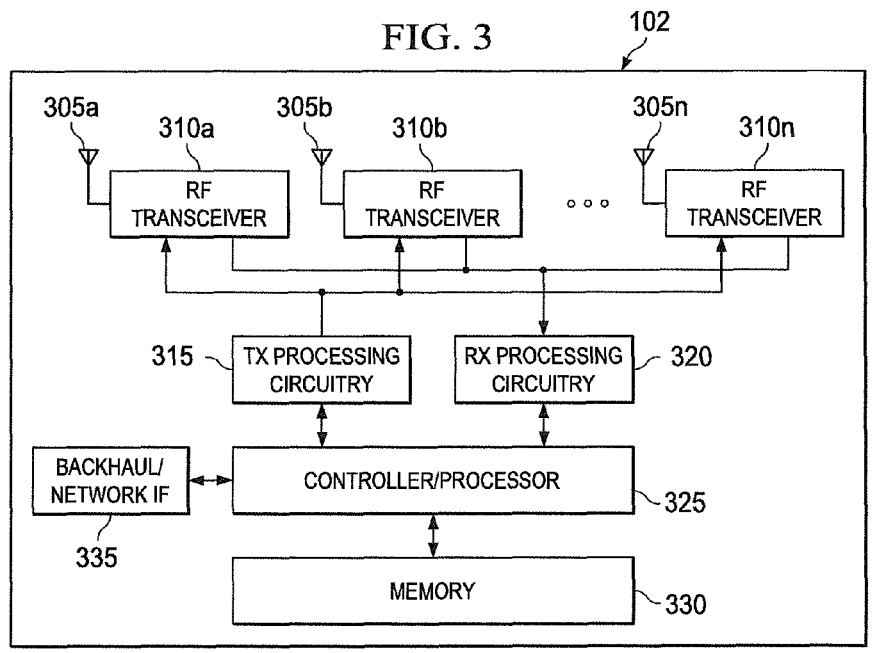
FIG. 3 illustrates an example eNodeB (eNB) according to this disclosure.

FIG. 3 illustrates an example eNB 102 according to this disclosure. The embodiment of the eNB 102 shown in FIG. 3 is for illustration only, and other eNBs of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 305a-305n, multiple RF transceivers 310a-310n, transmit (TX) processing circuitry 315, and receive (RX) processing circuitry 320. The eNB 102 also includes a controller/processor 325, a memory 330, and a backhaul or network interface 335.

The RF transceivers 310a-310n receive, from the antennas 305a-305n, incoming RF signals, such as signals transmitted by UEs or other eNBs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the eNB 102. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support beam forming or directional routing operations in which outgoing signals from multiple antennas 305a-305n are weighted differently to effectively steer the outgoing signals in a desired direction. Any of a wide variety of other functions could be supported in the eNB 102 by the controller/processor 325. In some embodiments, the controller/processor 325 includes at least one microprocessor or microcontroller.

The controller/processor 325 is also capable of executing programs and other processes resident in the memory 330, such as a basic OS and operations supporting uplink power control in adaptively configured time division duplex (TDD) communication systems. The controller/processor 325 can move data into or out of the memory 330 as required by an executing process.

The controller/processor 325 is also coupled to the backhaul or network interface 335. The backhaul or network interface 335 allows the eNB 102 to communicate with other devices or systems over a backhaul connection or over a network. The interface 335 could support communications over any suitable wired or wireless connection(s). For example, when the eNB 102 is implemented as part of a cellular communication system (such as one supporting 5G, LTE, or LTE-A), the interface 335 could allow the eNB 102 to communicate with other eNBs over a wired or wireless backhaul connection. When the eNB 102 is implemented as an access point, the interface 335 could allow the eNB 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As described in more detail below, the transmit and receive paths of the eNB 102 (implemented using the RF transceivers 310a-310n, TX processing circuitry 315, and/or RX processing circuitry 320) support downlink signaling for uplink and downlink adaptation in adaptively configured TDD systems.

Although FIG. 3 illustrates one example of an eNB 102, various changes may be made to FIG. 3. For example, the eNB 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the eNB 102 could include multiple instances of each (such as one per RF transceiver).

In some wireless networks, DL signals include data signals conveying information content, control signals conveying DL Control Information (DCI), and Reference Signals (RS), that are also known as pilot signals. An eNB, such as eNB 102, transmits data information through respective Physical DL Shared CHannels (PDSCHs). eNB 102 transmits DCI over Physical DL Control CHannels (PDCCHs) or Enhanced PDCCHs (EPDCCHs). A PDCCH is transmitted over one or more Control Channel Elements (CCEs) while an EPDCCH is transmitted over ECCEs (see also REF 1). An eNB, such as eNB 102, transmits one or more of multiple types of RS including a UE-Common RS (CRS), a Channel State Information RS (CSI-RS), and a DeModulation RS (DMRS). A CRS is effectively transmitted over an entire DL BandWidth (BW) and can be used by UEs, such as UE 114, to demodulate PDSCH or PDCCH, or to perform measurements. eNB 102 also can transmit CSI-RS with a smaller density in the time and/or frequency domain than a CRS. For channel measurement, Non-Zero Power CSI-RS (NZP CSI-RS) resources can be used. For interference measurement, UE 114 can use CSI Interference Measurement (CSI-IM) resources associated with a Zero Power CSI-RS (ZP CSI-RS) that is configured to the UE by eNB 102 using higher layer signaling (see also REF 1 and REF 3). DMRS is transmitted only in a BW of a respective PDSCH or PDCCH and UE 114 can use a DMRS to coherently demodulate information in a PDSCH or EPDCCH (see also REF 1).

In some wireless networks, UL signals can include data signals conveying information content, control signals conveying UL Control Information (UCI), and RS. UE 114 transmits data information or UCI through a respective Physical UL Shared CHannel (PUSCH) or a Physical UL Control CHannel (PUCCH). If UE 114 transmits data information and UCI in a same Transmission Time Interval (TTI), UE 114 can multiplex both in a PUSCH. UCI includes Hybrid Automatic Repeat reQuest ACKnowledgement (HARQ-ACK) information, indicating correct (ACK) or incorrect (NACK) detection of data Transport Blocks (TBs) in a PDSCH, Scheduling Request (SR) indicating whether UE 114 has data in its buffer, and Channel State Information (CSI) enabling eNB 102 to select appropriate parameters for PDSCH or PDCCH transmissions to UE 114. If UE 114 fails to detect a PDCCH scheduling a PDSCH, UE 114 can indicate this using a HARQ-ACK state referred to as DTX. A DTX and a NACK can often be mapped on a same value (NACK/DTX value, see also REF 3). UL RS includes DMRS and Sounding RS (SRS). DMRS is transmitted only in a BW of a respective PUSCH or PUCCH. eNB 102 can use a DMRS for coherent demodulation of information in a PUSCH or PUCCH. SRS is transmitted by UE 114 to provide eNB 102 with an UL CSI.

SRS transmission from a UE can be periodic (P-SRS) at predetermined TTIs with transmission parameters configured to UE 114 by higher layer signaling, such as for example Radio Resource Control (RRC) signaling, or it can be aperiodic (A-SRS) as triggered by a DCI format conveyed by a PDCCH or EPDCCH scheduling PUSCH or PDSCH. In all following descriptions, unless otherwise noted, a parameter is referred to as determined by configuration if its value is provided by higher layer signaling, such as RRC, while is referred to as dynamically determined if its value is provided by a DCI format conveyed in a PDCCH or EPDCCH.

Figure 4:
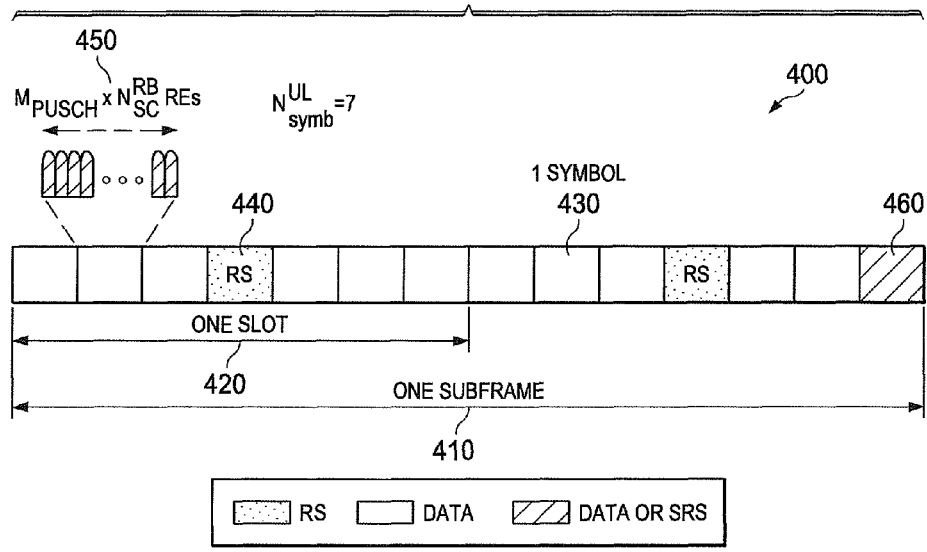
FIG. 4 illustrates an example PUSCH transmission structure over a Transmission Time Interval (TTI) according to this disclosure.

FIG. 4 illustrates an example PUSCH transmission structure over a TTI according to this disclosure. The embodiment of the PUSCH transmission structure 400 over a TTI shown in FIG. 4 is for illustration only. Other embodiments could be used without departing from the scope of the present disclosure.

As shown in FIG. 4, a TTI corresponds to one subframe 410 that includes two slots. Each slot 420 includes $N_{symb}^{UL}$ symbols 430 for transmitting data information, UCI, or RS. Some TTI symbols in each slot are used for transmitting DMRS 440. A transmission BW includes frequency resource units that are referred to as Resource Blocks (RBs). Each RB includes $N_{sc}^{RB}$ sub-carriers, or Resource Elements (REs), and UE 114 is allocated $M_{PUSCH}$ RBs 450 for a total of $M_{sc}^{PUSCH} = M_{PUSCH} \cdot N_{sc}^{RB}$ REs for a PUSCH transmission BW. The last TTI symbol may be used to multiplex SRS transmissions 460 from one or more UEs. A number of TTI symbols available for data/UCI/DMRS transmission is $N_{symb}^{PUSCH} = 2 \cdot (N_{symb}^{UL} - 1) - N_{SRS}$, where $N_{SRS} = 1$ if a last TTI symbol is used to transmit SRS and $N_{SRS} = 0$ otherwise.

Figure 5:
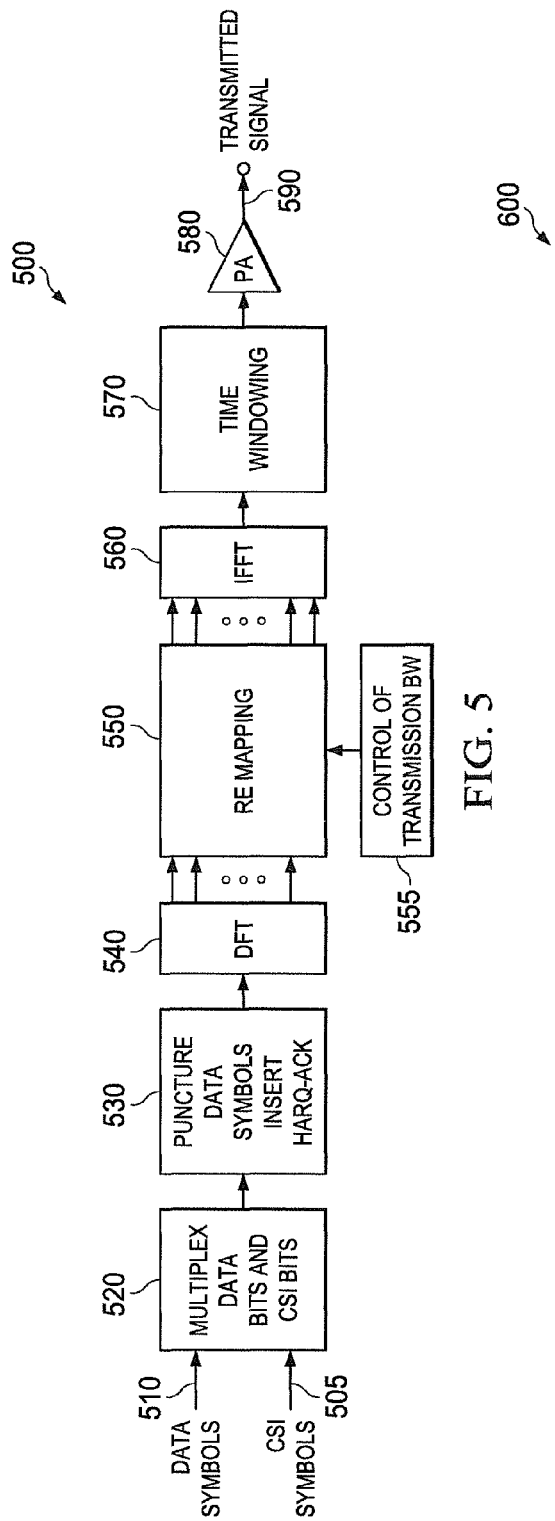
FIG. 5 illustrates an example UE transmitter structure for data information and UCI in a PUSCH according to this disclosure.

FIG. 5 illustrates an example UE transmitter structure for data information and UCI in a PUSCH according to this disclosure. The embodiment of the UE transmitter 500 shown in FIG. 5 is for illustration only. Other embodiments could be used without departing from the scope of the present disclosure. In certain embodiments, transmitter 500 is located within UE 114.

As shown in FIG. 5, coded and modulated CSI symbols 205 and coded and modulated data symbols 510 are multiplexed by multiplexer 520. Coded and modulated HARQ-ACK symbols are then inserted by multiplexer 530 by puncturing data symbols and/or CSI symbols. A transmission of RI is similar to one for HARQ-ACK (not shown). The Discrete Fourier Transform (DFT) is obtained by DFT unit 540, REs 550 corresponding to a PUSCH transmission BW are selected by selector 555, an Inverse Fast Fourier Transform (IFFT) is performed by IFFT unit 560, an output is filtered and by filter 570 and applied a certain power by Power Amplifier (PA) 580 and a signal is then transmitted 590. For brevity, additional transmitter circuitry such as digital-to-analog converter, filters, amplifiers, and transmitter antennas as well as encoders and modulators for data symbols and UCI symbols are omitted for brevity.

Figure 6:
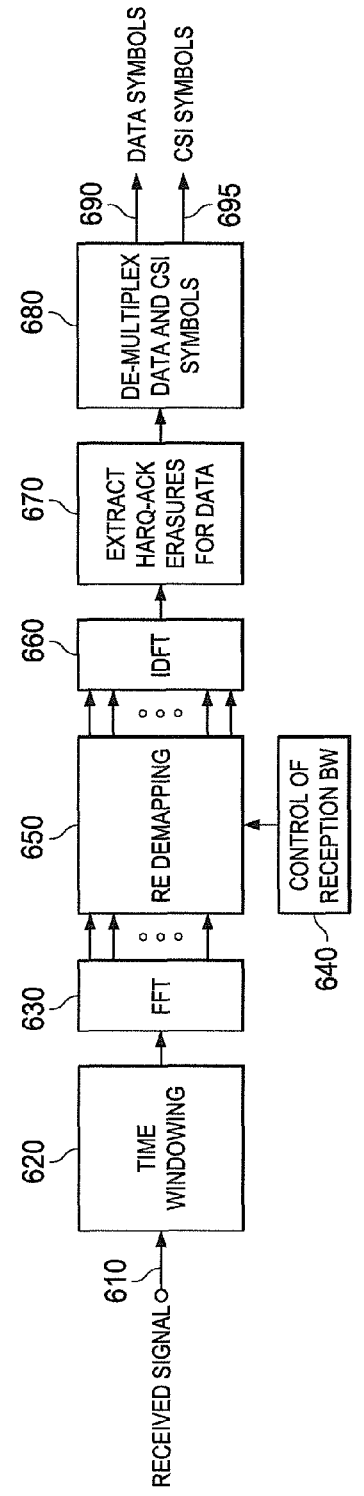
FIG. 6 illustrates an example eNB receiver structure for data information and UCI in a PUSCH according to this disclosure.

FIG. 6 illustrates an example eNB receiver structure for data information and UCI in a PUSCH according to this disclosure. The embodiment of the eNB receiver 600 shown in FIG. 6 is for illustration only. Other embodiments could be used without departing from the scope of the present disclosure. In certain embodiments, eNB receiver 600 is located within eNB 102.

As shown in FIG. 6, a received signal 610 is filtered by filter 620, a Fast Fourier Transform (FFT) is applied by FFT unit 630, a selector unit 640 selects REs 650 used by a transmitter, an Inverse DFT (IDFT) unit applies an IDFT 660, a de-multiplexer 670 extracts coded HARQ-ACK symbols and places erasures in corresponding REs for data symbols and CSI symbols and finally another de-multiplexer 680 separates coded data symbols 690 and coded CSI symbols 695. A reception of coded RI symbols is similar to one for coded HARQ-ACK symbols (not shown). Additional receiver circuitry such as a channel estimator, demodulators and decoders for data and UCI symbols are not shown for brevity.

Assuming for simplicity a transmission of one data TB in a PUSCH, UE 114 determines a number of coded modulation symbols per layer Q' for HARQ-ACK transmission as in Equation 1 (see also REF 2)

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right) \quad \text{(Equation 1)}$$

where $\lceil \ \rceil$ is the ceiling function rounding a number to its next integer, O is a number of HARQ-ACK information bits, $M_{sc}^{PUSCH}$ is a PUSCH transmission BW in the current TTI for the data TB, $N_{symb}^{PUSCH-initial}$ is the number of TTI symbols for initial PUSCH transmission for the same data TB, $\beta_{offset}^{PUSCH} = \beta_{offset}^{HARQ-ACK}$ is a value configured to the UE from eNB 102 by higher layer signaling, $M_{sc}^{PUSCH-initial}$ is a PUSCH transmission BW for initial PUSCH transmission for the same data TB, C is a number of code blocks, and $K_r$ is a number of bits for code block number r. When a PUSCH contains only CSI, in addition to HARQ-ACK, the UE determines a number of coded modulation symbols per layer Q' for HARQ-ACK as Q'=min $(\lceil O \cdot M_{sc}^{PUSCH} \cdot N_{symb}^{PUSCH} \cdot \beta_{offset}^{HARQ-ACK} / O_{CSI-MIN} \rceil$, $4 \cdot M_{sc}^{PUSCH})$, where $O_{CSI-MIN}$ is a minimum number of CSI information bits including Cyclic Redundancy Check (CRC) bits. A same determination for a number of coded modulation symbols per layer Q' applies for a transmission of RI with $\beta_{offset}^{PUSCH}$ replaced by $\beta_{offset}^{RI}$. For CSI, a number of coded modulation symbols per layer is determined as Q' as $$Q' = \min\left(\left\lceil \frac{(O \cdot L) \cdot M_{sc}^{PUSCH-initial} \cdot N_{symb}^{PUSCH-initial} \cdot \beta_{offset}^{CSI}}{\sum_{r=0}^{C-1} K_r} \right\rceil, M_{sc}^{PUSCH} \cdot N_{symb}^{PUSCH} - \frac{Q_{RI}}{Q_m}\right)$$

where O is a number of CSI bits, L is a number of CRC bits given by $$L = \begin{cases} 0 & O \le 11 \\ 8 & \text{otherwise} \end{cases},$$

and $Q_m$ is the number of information bits per modulation symbol. If RI is not transmitted then $Q_{RI}^{(x)}=0$. An encoding process for HARQ-ACK bits, or RI bits, or CSI bits is not discussed as it is not material to this disclosure (see REF 2).

In Equation 1, the parameter $\beta_{offset}^{PUSCH}$ for a respective UCI type serves for decoupling a BLock Error Rate (BLER) for a data TB from a BLER for the UCI type as it is inversely proportional to a spectral efficiency of data TB transmission. For example, for a given Signal to Noise and Interference Ratio (SINR), eNB 102 scheduler can use a larger spectral efficiency for a data TB transmission, leading to a larger BLER operating point for the data TB, but can maintain a fixed BLER for a UCI type by increasing a respective value of $\beta_{offset}^{PUSCH}$ which will then increase a number of REs allocated to UCI for multiplexing in a PUSCH.

A DMRS or SRS transmission can be through a transmission of a respective Zadoff-Chu (ZC) sequence. For a UL system BW of $N_{RB}^{max,UL}$ RBs, a sequence $r_{u,v}^{(\alpha)}(n)$ can be defined by a Cyclic Shift (CS) $\alpha$ of a base sequence $\bar{r}_{u,v}(n)$ according to $r_{u,v}^{(\alpha)}(n)=e^{j\alpha n}\bar{r}_{u,v}(n)$, $0 \le n < M_{sc}^{RS}$, where $M_{sc}^{RS}=mN_{sc}^{RB}$ is a sequence length, $1 \le m \le N_{RB}^{max,UL}$, and $\bar{r}_{u,v}(n)=x_q(n \mod N_{ZC}^{RS})$ where the $q^{th}$ root ZC sequence is defined by $$x_q(m) = \exp\left(\frac{-j\pi qm(m+1)}{N_{ZC}^{RS}}\right),$$

$0 \le m \le N_{ZC}^{RS}-1$ with q given by $q=\lfloor \bar{q}+\frac{1}{2} \rfloor + v \cdot (-1)^{\lfloor 2\bar{q} \rfloor}$ and $\bar{q}$ given by $\bar{q}=N_{ZC}^{RS} \cdot (u+1)/31$. A length $N_{ZC}^{RS}$ of a ZC sequence is given by a largest prime number such that $N_{ZC}^{RS}<M_{sc}^{RS}$ (see also REF 1). Multiple ZC sequences can be defined from a single base sequence using different values of $\alpha$. A DMRS transmission in two or more symbols of a TTI, as in FIG. 1, can also be modulated with an Orthogonal Covering Code (OCC). For a DMRS transmission in a PUSCH scheduled by PDCCH, UE 114 determines a respective ZC sequence from a system information or from a configuration by higher layer signaling and determines a CS and an OCC from a respective CS and OCC index field included in a DCI format scheduling the PUSCH transmission.

Figure 7:
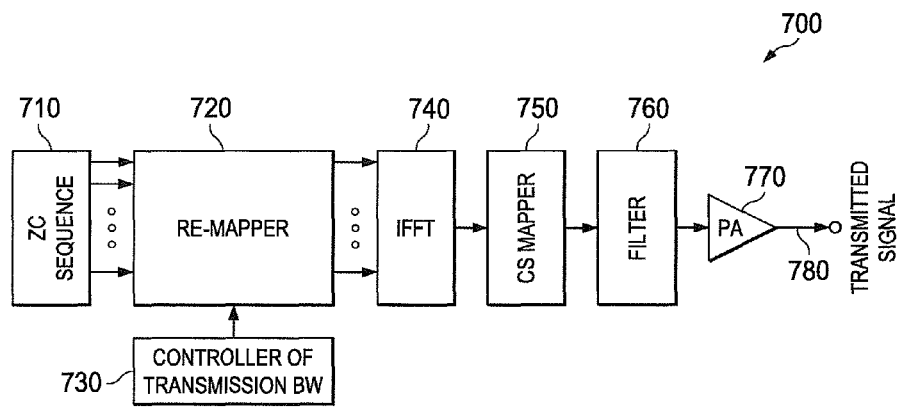
FIG. 7 illustrates an example transmitter structure for a ZC sequence that can be used as DMRS or as SRS according to this disclosure.

FIG. 7 illustrates an example transmitter structure for a ZC sequence that can be used as DMRS or as SRS according to this disclosure. The embodiment of the transmitter 700 shown in FIG. 7 is for illustration only. Other embodiments could be used without departing from the scope of the present disclosure. In certain embodiments, the transmitter 700 is located within UE 114.

As shown in FIG. 7, a mapper 720 maps a ZC sequence of length $M_{sc}^{RS}$ 710 to REs of a transmission BW as they are indicated by RE selection unit 730. The mapping can be to consecutive REs for a DMRS or to alternate REs for a SRS thereby creating a comb spectrum (see also REF 1). Subsequently, an IFFT is performed by IFFT unit 740, a CS is applied to the output by CS unit 750, a resulting signal is filtered by filter 760, a transmission power is applied by power amplifier 770, and the RS is transmitted 780.

A PUSCH transmission power is determined so that an associated signal is received with a desired SINR at eNB 102 while controlling a respective interference to neighboring cells thereby achieving a reception reliability target and ensuring proper network operation. UL Power Control (PC) includes Open-Loop Power Control (OLPC) with cell-specific and UE-specific parameters and Closed Loop Power Control (CLPC) corrections provided by eNB 102 through Transmission Power Control (TPC) commands. If a PUSCH transmission is scheduled by a PDCCH, a TPC command is included in a respective DCI format. TPC commands can also be provided by a separate PDCCH conveying a DCI format 3 or a DCI format 3A, jointly referred to as DCI format 3/3A, providing TPC commands to a group of UEs. A DCI format includes Cyclic Redundancy Check (CRC) bits and the UE 114 identifies a DCI format type from a respective Radio Network Temporary Identifier (RNTI) used to scramble the CRC bits. For DCI format 3/3A, a RNTI is a TPC-RNTI the UE 114 is configured by higher layer signaling. For a DCI format scheduling a PUSCH transmission from the UE 114 or a PDSCH transmission to the UE 114, a RNTI is a Cell RNTI (C-RNTI). Additional RNTI types also exist (see also REF 2).

The UE 114 can derive a PUSCH transmission power $P_{PUSCH,c}(i)$, in deciBels per milliwatt (dBm), in a cell c during TTI i as in Equation 2. For simplicity, it is assumed that the UE does not transmit both PUSCH and PUCCH in a same TTI (see also REF 3).

$$P_{PUSCH,c}(i) = \qquad \text{(Equation 2)}$$
$$\min\{P_{CMAX,c}(i), 10\log_{10}(M_{PUSCH,c}(i)) + P_{O\_PUSCH,c}(j) + \alpha_c(j) \cdot PL_c + \Delta_{TF,c}(i) + f_c(i)\}[dBm]$$

where $P_{CMAX,c}(i)$ is a maximum UE transmit power configured to the UE 114 by higher layer signaling, $M_{PUSCH,c}(i)$ is a PUSCH transmission BW in RBs, $P_{O\_PUSCH,c}(j)$ controls a mean received SINR at the eNB 102 and is the sum of a cell-specific component $P_{O\_NOMINAL\_PUSCH,c}(j)$ and a UE-specific component $P_{O\_UE\_PUSCH,c}(j)$ provided to the UE 114 by higher layer signaling. For Semi-Persistently Scheduled (SPS) PUSCH, j=0. For dynamically scheduled PUSCH, j=1. $PL_c$ is a Path Loss (PL) estimate computed by the UE 114. For j=0 or j=1, $\alpha_c(j) \in \{0, 0.4, 0.5, 0.6, 0.7, 0.8, 0.9, 1\}$ is configured to the UE 114 by higher layer signaling. Fractional UL PC is obtained for $\alpha_c(j)<1$ as a PL is not fully compensated. $\Delta_{TF,c}(i)$ is either equal to 0 or is determined by a spectral efficiency of a PUSCH transmission. Further details are not material to the present invention and are omitted. Finally, $f_c(i)=f_c(i-1)+\delta_{PUSCH,c}(i-K_{PUSCH})$ if accumulative CLPC is used, and $f_c(i)=\delta_{PUSCH,c}(i-K_{PUSCH})$ if absolute CLPC is used where $\delta_{PUSCH,c}(i-K_{PUSCH})$ is a TPC command included in a DCI format scheduling a PUSCH or included in a DCI format 3/3A. $K_{PUSCH}$ is derived from a timeline between a TTI of a PDCCH transmission scheduling a PUSCH and a TTI of a respective PUSCH transmission.

A power of a SRS $P_{SRS,c}(i)$ in cell c during TTI i follows a PUSCH transmission power as in Equation 3 (see also REF 3)

$$P_{SRS,c}(i) = \min\{P_{CMAX,c}(i), P_{SRS\_OFFSET,c}(m) + 10\log_{10}(M_{SRS,c}) + P_{O\_PUSCH,c}(j) + \alpha_c(j) \cdot PL_c + f_c(i)\} \text{ [dBm]}$$ (Equation 3)

where $P_{SRS\_OFFSET,c}(m)$ is a 4-bit parameter configured to the UE 114 by higher layer signaling, with m=0 for P-SRS and m=1 for A-SRS, and $M_{SRS,c}$ is a SRS transmission BW expressed in number of RBs.

A power for a PUCCH transmission follows similar principles as a power for a PUSCH transmission or SRS transmission (see also REF 3) but, as it is not relevant to this disclosure, further discussion is omitted for brevity.

In a TDD communication system, a communication direction in some TTIs is in the DL, and a communication direction in some other TTIs is in the UL. Table 1 lists indicative UL-DL configurations over a period of 10 TTIs (a TTI, or subframe (SF), has a duration of 1 millisecond (msec)), which is also referred to as frame period. "D" denotes a DL TTI, "U" denotes a UL TTI, and "S" denotes a special TTI that includes a DL transmission field referred to as DwPTS, a Guard Period (GP), and a UL transmission field referred to as UpPTS. Several combinations exist for a duration of each field in a special TTI subject to the condition that the total duration is one TTI.

An operating constraint in an adaptation of a TDD UL-DL configuration in ways other than conventional ones is the possible existence of UEs that cannot be aware of such adaptation. Such UEs are referred to as conventional UEs. Since conventional UEs perform measurements in DL TTIs using a respective CRS, such DL TTIs cannot be changed to UL TTIs or to special TTIs by a faster adaptation of a TDD UL-DL configuration. However, an UL TTI can be changed to a DL TTI without impacting conventional UEs because the eNB 102 can ensure that such UEs do not transmit any signals in such UL TTIs. In addition, an UL TTI common to all TDD UL-DL configurations could exist to enable the eNB 102 to possibly select this UL TTI as the only UL one. In some implementations, including all TDD UL-DL configurations in Table 1, this UL TTI is TTI#2.

A DL TTI is a fixed one if it is a DL TTI in a conventional TDD UL-DL configuration. A special TTI can only switch to a DL TTI. With respect to the descriptions of this disclosure, the only UL fixed TTI is TTI#2. In general, UL TTIs of a TDD UL-DL configuration that is configured by the eNB 102 to the UE 114 and can be used by the UE for HARQ-ACK signal transmissions are fixed UL TTIs. A TTI is referred to as DL flexible TTI if it is an UL TTI in a conventional TDD UL-DL configuration and is adapted to a DL TTI. A TTI is referred to

TABLE 1

TDD UL-DL configurations

| TDD UL-DL Configuration | DL-to-UL Switch-point periodicity | TTI (SF) number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The TDD UL-DL configurations in Table 1 provide 40% and 90% of DL TTIs per frame to be DL TTIs (and the remaining to be UL TTIs). Despite this flexibility, a semi-static TDD UL-DL configuration that can be updated every 640 msec or less frequently by signaling of a System Information Block (SIB) or, in case of DL Carrier Aggregation and a secondary cell by RRC signaling (see also REF3 and REF 4), may not match well with short-term data traffic conditions. For the remaining of this disclosure, such a TDD UL-DL configuration will be referred to as a conventional (or non-adapted) TDD UL-DL configuration and it is assumed to be used by conventional (or legacy) UEs in a cell. For this reason, a faster adaptation period of a TDD UL-DL configuration can improve system throughput, particularly for a low or moderate number of connected UEs in a cell. For example, when there is more DL traffic than UL traffic, a conventional TDD UL-DL configuration can be adapted every 10, 20, 40, or 80 msec to include more DL TTIs. Signaling for faster adaptation of a TDD UL-DL configuration can in principle be provided by several mechanisms, including signaling of a DCI format in a PDCCH.

as UL flexible TTI if it is an UL TTI in a conventional TDD UL-DL configuration that, although it can be adapted to a DL TTI in an adapted TDD UL-DL configuration, it remains an UL TTI.

Considering the above, Table 2 indicates a maximum number of flexible TTIs (denoted by 'F') for each TDD UL-DL configuration in Table 1. Evidently, as DL TTIs in a conventional TDD UL-DL configuration cannot be changed to UL TTIs, not all TDD UL-DL configurations can be used for adaptation. For example, if TDD UL-DL configuration 2 is the conventional one, an adaptation can be only to TDD UL-DL configuration 5. Also, a use of a configured TDD UL-DL configuration for UE 114 to derive UL TTIs for HARQ-ACK transmissions further restricts TDD UL-DL configuration that can be used for adaptation as such UL TTIs are UL fixed TTIs. Therefore, an indication for an adaptation for a TDD UL-DL configuration can be considered by the UE 114 as invalid if, for example, it switches a DL TTI in the conventional TDD UL-DL configuration in an UL TTI. Invalid indications can be caused, by example, by the misdetection from the UE 114 of a DCI format conveying an indication for an adapted TDD UL-DL configuration.

TABLE 2

Flexible TTIs (F) for TDD UL-DL configurations

| TDD UL-DL Configuration | DL-to-UL Switch-point periodicity | TTI (SF) number | | | | | | | | |
|---|---|---|---|---|---|---|---|---|---|---|
| | | 0 | 1 | 2 | 3 | 4 | 5 | 6 | 7 | 8 | 9 |
| 0 | 5 ms | D | S | U | F | F | D | F | F | F | F |
| 1 | 5 ms | D | S | U | F | D | D | F | F | F | D |
| 2 | 5 ms | D | S | U | D | D | D | F | F | D | D |
| 3 | 10 ms | D | S | U | F | F | D | D | D | D | D |
| 4 | 10 ms | D | S | U | F | D | D | D | D | D | D |
| 5 | 10 ms | D | S | U | D | D | D | D | D | D | D |
| 6 | 5 ms | D | S | U | F | F | D | F | F | F | D |

A power of an UL transmission in an UL flexible TTI can be different than in an UL fixed TTI as interference in the former may be from a combination of DL transmissions or UL transmissions in adjacent cells while interference in the latter is always from UL transmissions in adjacent cells. Two separate UL PC processes can be considered; one for use in fixed TTIs, such as TTI#2, and another for use in flexible TTIs. Each UL PC process can have separate OLPC processes through respective values of $P_{O\_PUSCH,c}(j)$ and $\alpha_c(j)$ or can have separate CLPC processes through separate application of TPC commands $\delta_{PUSCH,c}$. However, a conventional approach of having a single UL PC process for flexible TTIs may not be sufficient as different flexible TTIs can experience different interference characteristics. Moreover, having a same UL PC process for all UEs in a cell may also not be sufficient as different UEs can experience different interference.

Figure 8:
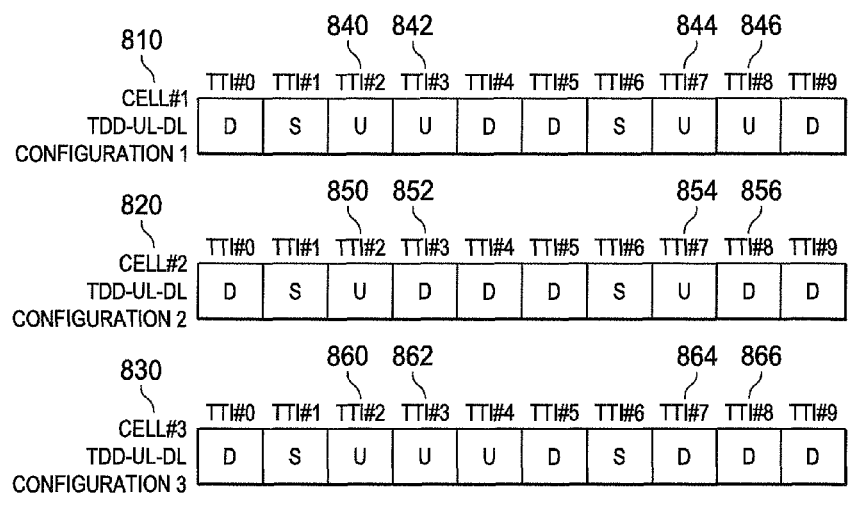
FIG. 8 illustrates an example of different interference characteristics in different UL flexible TTIs according to this disclosure.
Figure 13:
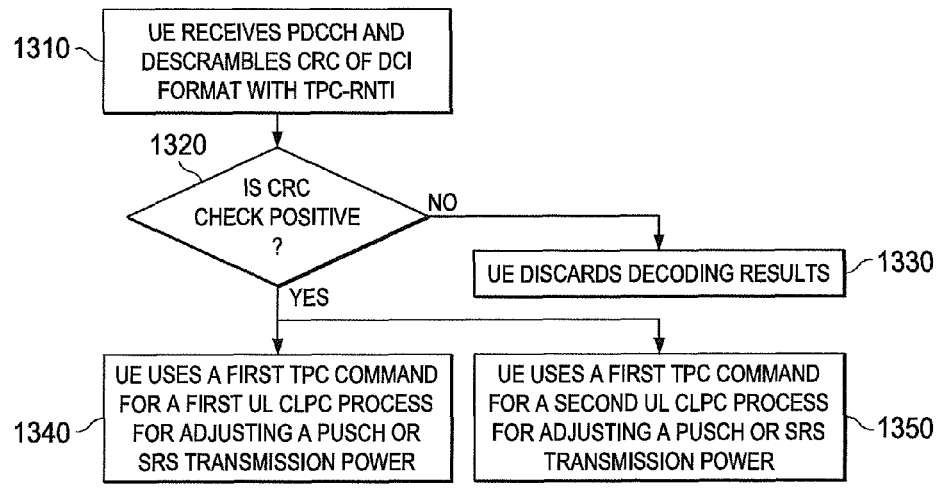
FIG. 13 illustrates an example UE determination of a TPC command for a first UL PC process and of a TPC command for a second UL PC process in a same DCI format 3/3A according to this disclosure.

FIG. 8 illustrates an example of different interference characteristics in different UL flexible TTIs according to this disclosure. The embodiments of the interference characteristics shown in different flexible TTIs shown in FIG. 13 are for illustration only. Other embodiments could be used without departing from the scope of the present disclosure.

As shown in FIG. 8, TDD UL-DL configuration 1 is used in reference cell#1 810, TDD UL-DL configuration 2 is used in interfering cell#2 820, and TDD UL-DL configuration 3 is used in interfering cell#3 830. In fixed TTI#2 in cell#1 840, cell#2 850, and cell#3 860, an interference experienced by UL transmissions is statistically same and a conventional UL PC process can apply. In flexible TTI#3 in cell#1 842, an interference experienced by UL transmissions is different than in fixed TTI#2 as flexible TTI#3 is used for DL transmissions in cell#2 852 and for UL transmissions in cell#3 862. Therefore, the UE 114 in cell#1 that is located towards cell#2 can experience significantly different interference in TTI#3 than in TTI#2. In flexible TTI#7 in cell#1 844, an interference experienced by UL transmissions is different than in fixed TTI#2, or flexible TTI#3, as flexible TTI#7 is an UL TTI in cell#2 854 while it is a DL TTI in cell#3 864. Therefore, UL transmissions from the UE 114 in cell#1 that is located towards cell#3 can experience significantly different interference in TTI#7 than in TTI#2 or in TTI#3. Finally, in flexible TTI#8 in cell#1 846, an interference experienced by UL transmissions can be different than in fixed TTI#2, or in flexible TTI#3, or in flexible TTI#7, as flexible TTI#8 is a DL TTI in both cell#2 856 and cell#3 866. Therefore, not only there exists interference variation between the two TTI types (fixed and flexible) but also there exists interference variation in different flexible TTIs.

A consequence of larger interference variations in an UL flexible TTI relative to a UL fixed TTI is that a reception reliability of data TBs transmitted in a PUSCH in a flexible UL TTI can be worse than the one of data TBs transmitted in a PUSCH is a UL fixed TTI. In general, a reception reliability of data TBs in a PUSCH can be worse when the interference in a respective TTI in a DL one than when it is an UL one. This is not a serious issue for transmissions of data TBs, as they can benefit from HARQ retransmissions, but it is a serious issue for UCI transmissions in a PUSCH that have stricter reliability requirements and cannot benefit for HARQ retransmissions.

Embodiments of this disclosure provide mechanisms for associating a first UL PC process and a second UL PC process with a first set of TTIs and with a second set of TTIs in a frame, respectively, in a UE-specific manner where an UL flexible TTI, that is an UL TTI other than TTI#2, can be associated with either the first UL PC process or the second UL PC process. Embodiments of this disclosure provide TPC commands by DCI format 3/3A for signal transmissions from UE 114 in a first set of TTIs and in a second set of TTIs. Embodiments of this disclosure also provide mechanisms for supporting an UL PC process in a second set of TTIs after an adaptation of a TDD UL-DL configuration. Furthermore, embodiments of this disclosure provide mechanisms to enable a reception reliability for data TBs or CSI in a PUSCH UE 114 transmits in an UL flexible TTI that is comparable to a reception reliability for data TBs or CSI in a PUSCH UE 114 transmits in an UL fixed TTI. Additionally, embodiment of this disclosure provide mechanisms for transmitting and receiving a retransmission of a data transport block in a TTI associated with a first (or second) UL PC process for an initial transmission of the data transport block in a TTI associated with a second (or first) UL PC process.

Adaptation of OLPC and CLPC Parameters in UL Flexible TTIs

In certain embodiments, since values of OLPC parameters such as $P_{O\_PUSCH,c}(j)$ or $\alpha_c(j)$, or CLPC parameters such as $f_c(i)$, the UE 114 uses for UL signal transmissions can depend on the UE 114 location within a cell, an adaptation of such values may not only depend on whether an UL TTI is fixed one or a flexible one but rather it can also depend on a particular UL flexible TTI. A same UL PC process as for an UL fixed TTI, such as TTI#2 in Table 2, can be used in a first UL flexible TTI while a different UL PC process than for an UL fixed TTI can be used in a second UL flexible TTI. Moreover, an adaptation for values of OLPC or CLPC parameters for each UL PC process is UE-specific as an interference experienced by an UL signal transmission can be different for different UEs in a same UL flexible TTI. For UL signal transmissions in a same UL flexible TTI, a first UE 114 can use a same UL PC process as in an UL fixed TTI while a second UE 115 can use a different UL PC process than in an UL fixed TTI.

As the UE 114 typically experiences dominant interference from one adjacent cell, an UL PC process in an UL flexible TTI can be same as for an UL fixed TTI if the flexible TTI in a dominant interfering cell is also an UL TTI. Conversely, an UL PC process in an UL flexible TTI can be different than for an UL fixed TTI if the UL flexible TTI in a dominant interfering cell is a DL TTI. Therefore, an UL PC process for a PUSCH or an A-SRS transmission in an UL flexible TTI can be indicated to the UE 114 to be either same as one for an UL fixed TTI (TTI#2 for the TDD UL-DL configurations in Table 2) or different than one in an UL fixed TTI. Therefore, two sets of UL TTIs are determined according to a respective UL PC process for PUSCH or A-SRS transmission; a first set that includes TTI#2 where a first, conventional, UL PC process is used and a second set where a second UL PC process is used. Each UL PC process can be associated with different values of $P_{O\_PUSCH,c}(j)$ or $\alpha_c(j)$ for OLPC or with different CLPC loops $f_c(i)$ which can be configured to the UE 114 in advance through higher layer signaling and do not need to be adapted at a same rate as an adaptation of a TDD UL-DL configuration. For A-SRS transmission, $P_{SRS\_OFFSET,c}(m)$ can also be configured separately for each UL PC process for respective OLPC. An indication to the UE 114 to use a first UL PC process or a second UL PC process in an UL flexible TTI is configured by RRC signaling and, when possible, the RRC configuration can be supplemented by dynamic indication provided by a DCI format in a PDCCH or EPDCCH that schedules a PUSCH or A-SRS transmission.

In a first approach for dynamic indication, an indication for the UE 114 to use a first set of values or a second set of values for OLPC or CLPC parameters for UL signal transmission in an UL TTI (other than TTI#2) is provided by including an additional Power Control Configuration (PCC) field, having one binary element, in DCI formats scheduling PUSCH transmissions. For PUSCH scheduling in UL fixed TTI#2 where a first set of values for OLPC or CLPC parameters is assumed to always be used, the PCC field can be set to a default value, such as '0'. An exception can be when an A-SRS transmission is also triggered to occur in an UL flexible TTI in which case the PCC field can be interpreted as indicating a set of values for OLPC or CLPC parameters applicable to the A-SRS transmission in the UL flexible TTI.

Figure 9:
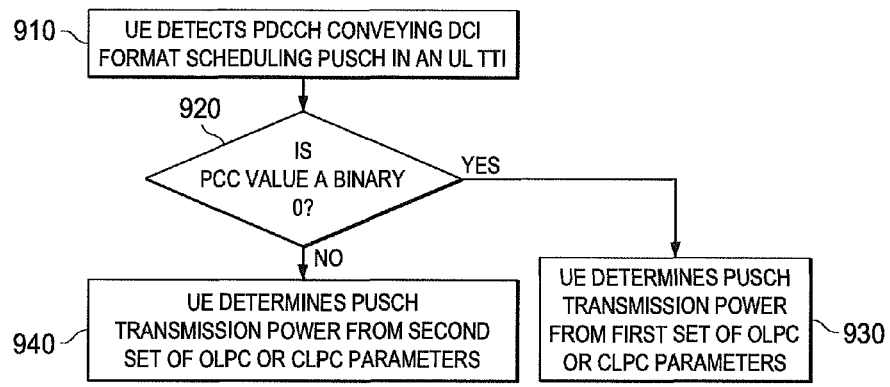
FIG. 9 illustrates an example use of a PCC field in a DCI format for associating a respective PUSCH transmission with a first UL PC process or with a second UL PC process according to this disclosure.

FIG. 9 illustrates an example use of a PCC field in a DCI format for associating a respective PUSCH transmission with a first UL PC process or with a second UL PC process according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

As shown in FIG. 9, the UE 114 detects a PDCCH conveying a DCI format scheduling a PUSCH in an UL TTI in operation 910. The UE 114 examines a value of a 1-bit PCC field included in the DCI format in operation 920. If this value is a binary '0', the UE 114 transmits a PUSCH with a transmission power determined according to a first set of values for OLPC or CLPC parameters in operation 930 (first UL PC process). If this value is a binary '1', the UE 114 transmits a PUSCH with a transmission power determined according to a second set of values for OLPC or CLPC parameters in operation 940 (second UL PC process).

In a second approach for dynamic indication, an indication for the UE 114 to use a first set of values or a second set of values for OLPC or CLPC parameters for UL signal transmission in an UL TTI (other than TTI#2) is by reinterpreting a TPC field of 2 bits in a respective DCI format scheduling a PUSCH or A-SRS transmission. A conventional interpretation of a TPC field of 2 bits is that each value indicates a transmission power adjustment in deciBels (dB) with '00', '01', '10', and '11' indicating respectively −1 dB, 0 dB, 1 dB, and 3 dB (see also REF 3). For a PUSCH or an A-SRS transmission in an UL TTI other than TTI#2, one bit of the TPC field, such as for example the first bit, can be used to indicate a transmission power adjustment and the other bit of the TPC field can be used to indicate a use of a first UL PC process or of a second UL PC process. For example, the values of the transmission power adjustment can be −1 dB or 1 dB or can depend on whether a first UL PC process or a second UL PC process is indicated.

Figure 10:
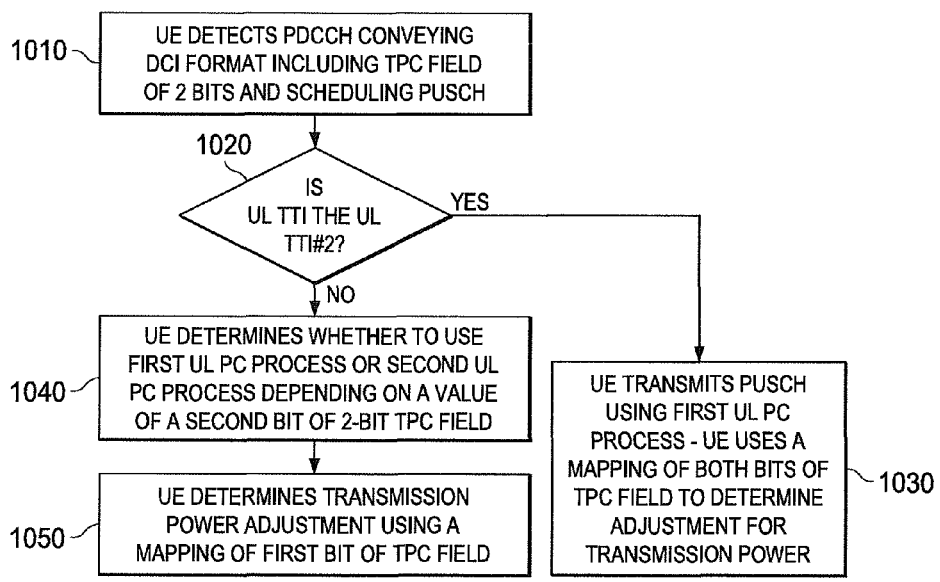
FIG. 10 illustrates an example use of a TPC field in a DCI format scheduling a PUSCH depending on whether it can indicate use of a first UL PC process or a second UL PC process according to this disclosure.

FIG. 10 illustrates an example use of a TPC field in a DCI format scheduling a PUSCH depending on whether it can indicate use of a first UL PC process or a second UL PC process according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

As shown in FIG. 10, a UE 114 detects a PDCCH conveying a DCI format including a TPC field of 2 bits and scheduling a PUSCH transmission in operation 1010. The UE 114 subsequently examines whether a respective TTI is the UL fixed TTI#2 in operation 1020. If it is TTI#2, the UE 114 transmits a PUSCH using a first set of values for OLPC or CLPC parameters corresponding to a first UL PC process and uses a mapping of both bits of the TPC field to determine a value for adjusting a transmission power in operation 1030. If the TTI is not TTI#2, the UE 114 determines whether to use a first set of values or a second set of values for OLPC or CLPC parameters, corresponding to a first or second UL PC process respectively, depending on a value of a second bit of the 2-bit TPC field in operation 1040. For example, if the second bit value is a binary '0', the UE 114 uses a first UL PC process; otherwise, if the second bit value is a binary '1', the UE 114 uses a second UL PC process. Finally, the UE 114 further determines a transmission power adjustment using a mapping of a first bit of the TPC field 1050.

In a third approach for dynamic indication, an indication for a UE 114 to use a first set of values or a second set of values for OLPC or CLPC parameters for UL signal transmission in an UL TTI (other than TTI#2) is by re-interpreting states of another field included in a DCI format scheduling a PUSCH to provide the above indication. For example, as a number of UEs with active connection to the eNB 102 that are configured operation with an adapted TDD UL-DL configuration is typically not large, a 3-bit CS and OCC index field in a DCI format used for enabling spatial multiplexing of PUSCH transmissions among UEs (also see REF 2) is typically excessive. Then, for a PUSCH transmission in a TTI other than TTI#2, 1 bit from the 3 bits of the CS and OCC field can be used to provide an indication for a first UL PC process or for a second UL PC process. Such an approach can be extended to other fields of a DCI format by respectively limiting their scope. As the UE 114 operation is similar to that for the second approach, further illustration is omitted for brevity.

For any approach relying on supplemental dynamic indication of a first UL PC process or of a second UL PC process, if a PUSCH transmission conveys a retransmission for a data TB, it occurs in a TTI other than TTI#2, and it is triggered by an DL HARQ-ACK signal (NACK for a previous transmission of same data TB, see also REF 3), the UE 114 needs to implicitly determine whether to use the first UL PC process or the second UL PC process. If the UE 114 was scheduled by PDCCH or EPDCCH a PUSCH transmission in a same TTI in a previous frame for a same TDD UL-DL configuration, the UE 114 maintains a same (first or second) UL PC process for the PUSCH transmission conveying a retransmission of a data TB. If the UE 114 was not scheduled by PDCCH or EPDCCH any PUSCH transmission in a same TTI in a previous frame for a same TDD UL-DL configuration, an implicit rule can apply for the UE 114 to determine whether to use the first UL PC process or the second UL PC process. For example, if for an initial transmission of a same data TB, a CS and OCC index field including 3 bits in a respective DCI format indicated one of the four smaller values, the UE 114 can use a first UL PC for the retransmission of the data TB; otherwise, if the CS and OCC index field indicated one of the four larger values, the UE 114 can use a second UL PC for the retransmission of the data TB.

Figure 11:
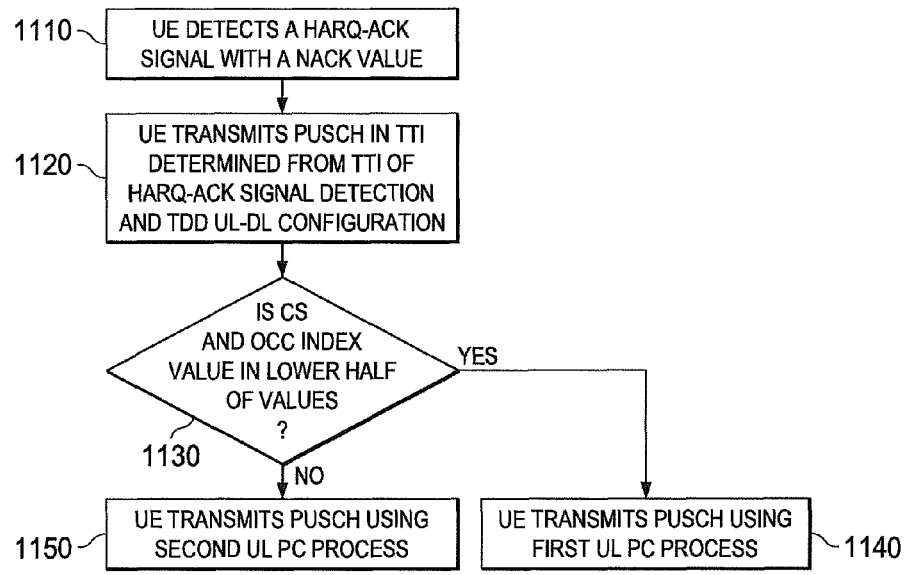
FIG. 11 illustrates an example process for a UE to determine whether to use a first UL PC process or a second UL PC process for a non-adaptive retransmission of a data TB in a PUSCH according to this disclosure.

FIG. 11 illustrates an example process for a UE to determine whether to use a first UL PC process or a second UL PC process for a non-adaptive retransmission of a data TB in a PUSCH according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

As shown in FIG. 11, UE 114 detects a HARQ-ACK signal conveying a NACK for an initial transmission of a data TB in operation 1110. The UE 114 transmits a PUSCH conveying a retransmission of the data TB in a TTI (other than TTI#2) according to a HARQ timeline depending on a TTI index of HARQ-ACK signal detection for a configured TDD UL-DL configuration in operation 1120. The UE 114 determines whether to use a first UL PC process or a second UL PC process for a PUSCH transmission based on a value of a CS and OCC index field included in a DCI format scheduling the initial PUSCH transmission for the same data TB in operation 1130. If the value of the CS and OCC index field is in the lower half of values, the UE 114 uses a first UL PC process in operation 1140. If the value of the CS and OCC index field is in the upper half of values, the UE 114 uses a second UL PC process in operation 1150.

A TTI for A-SRS transmission triggered by a DCI format a UE 114 detects in DL TTI n is determined as a first UL TTI satisfying n+k, k≥4 and $(10 \cdot n_f + k_{SRS} - T_{offset,1}) \bmod T_{SRS,1} = 0$ where $k_{SRS}$ is a TTI index within a frame $n_f$, $T_{offset,1}$ is an A-SRS TTI offset, $T_{SRS,1}$ is an A-SRS periodicity (see also REF 3). An A-SRS can then be transmitted either in an UL fixed TTI (such as TTI#2) or in an UL flexible TTI. If an A-SRS transmission is triggered by a PDCCH scheduling a PDSCH and the A-SRS is to be transmitted in an UL flexible TTI, the first two approaches can again be used. Specifically, DCI formats scheduling a PDSCH and supporting A-SRS triggering can either include a PCC field, applicable to A-SRS transmissions in a same manner as the PCC field in DCI formats scheduling a PUSCH for indicating whether a first or a second UL process should be used, or the TPC field can be split into two parts (only when A-SRS is triggered) with a first part indicating a TPC command and a second part acting as a PCC. Alternatively, for an A-SRS transmission triggered by a PDCCH scheduling a PDSCH, a second UL PC process can be used by default as such triggering is primarily beneficial when there is UL-dominant interference. If the A-SRS is to be transmitted in an UL fixed TTI, such as TTI#2, a conventional UL PC process (first UL PC process) applies.

While two different UL PC processes can apply for PUSCH or A-SRS transmissions, this disclosure considers that PUCCH transmissions can be in fixed TTIs and therefore a single (first) UL PC process suffices. One reason for such a restriction is to protect PUCCH transmissions from DL interference as, unlike data transmissions in PUSCHs, transmission of control information in a PUCCH typically requires higher reception reliability and cannot benefit from HARQ retransmissions. Another reason is that using a second UL PC process and applying a larger transmission power in a UL TTI where legacy UEs transmit control information in PUCCHs (or even data information in PUSCHs) can create unwanted in-band emissions and severely degrade a reception reliability of information transmitted from conventional UEs that use a first UL PC process. A consequence of avoiding in-band emissions and receiving signals using a second UL PC process with much larger power than signals using a first UL PC process in a same TTI is that a second UL PC process may not be used in TTIs where conventional UEs transmit signals even if UE 114 experiences primarily DL interference in such TTIs. Therefore, regardless of an UL TTI, a same UL PC process is always used for PUCCH transmissions by both conventional UEs and UEs configured for operation with an adapted TDD UL-DL configuration.

PUCCH transmissions also can occur in an UL flexible TTI, that is an UL TTI other than TTI#2, that nevertheless cannot be adapted to a DL one, based on another TDD UL-DL configuration that is configured to the UE 114 for HARQ-ACK transmissions in response to PDCCH detections. For example, if UL-DL configuration 2 is configured to the UE 114 for HARQ-ACK transmissions, TTI#7 is always an UL TTI even though it could be an UL flexible TTI if UL-DL configuration 5 is configured to the UE 114 for HARQ-ACK transmissions (only TTI#2 is always an UL TTI regardless of a TDD UL-DL configuration that is configured to the UE 114 for HARQ-ACK transmissions). Then, as this disclosure considers that a first UL PC process is always used for PUCCH transmissions and as TTI#7 can be used for HARQ-ACK signal transmissions from the UE 114 in a PUCCH, a first UL PC process is also used for TTI#7. In general, a first UL PC process is used for all UL signaling (PUSCH, SRS, PUCCH) in every TTI, in addition to TTI#2, where the UE 114 can transmit a PUCCH.

For P-SRS transmissions, as a TTI type (fixed or flexible) is predetermined by configuration, whether a first or a second UL PC process is used is also predetermined by configuration. For a SPS PUSCH transmission, this disclosure further considers that it can always be in a fixed TTI and use a first UL PC process as an adaptation of a TDD UL-DL configuration can be faster than a configuration of an UL TTI where SPS PUSCH is transmitted.

For PUSCH transmissions, an association of an UL TTI with a first UL PC process or a second UL PC process can also rely exclusively on configuration (RRC signaling) without a supplemental dynamic signaling. For example, considering adjacent-channel interference from a cell that does not adapt its TDD UL-DL configuration faster than a conventional one, a use of a first UL PC process or of a second UL PC process in a TTI can be signaled to the UE 114 in a semi-static manner by RRC signaling. A same approach can apply for PUSCH retransmission triggered by a HARQ-ACK signal with a NACK value, as there is no associated DCI format to dynamically indicate an UL PC process for the UE to use in a TTI of the PUSCH retransmission, or for an A-SRS configured to occur in an UL flexible TTI and triggered by an adaptation of a TDD UL-DL configuration.

Considering a frame of 10 TTIs and that TTI#2 is an UL fixed TTI while TTI#0, TTI#1, TTI#5 are either fixed DL TTIs or fixed special TTIs (having a same configuration of DwPTS length and UpPTS length) in all TDD UL-DL configurations, the RRC signaling can be a bit-map that includes 6 bits (for flexible TTI#3, TTI#4, TTI#6, TTI#7, TTI#8, and TTI#9) wherein, for a respective TTI, a bit value of '0' can indicate use of a first UL PC process while a bit value of '1' can indicate use of a second UL PC process. A reason for a possible association of a second UL PC process with TTI#6 is because if it is a special TTI it can support UL transmissions in the UpPTS, such as for example SRS transmissions, and the UE 114 can experience either UL interference or DL interference (if it is a DL TTI in a TDD UL-DL configuration used in an adjacent cell). A bit-map can also be defined with a size equal to a number flexible TTIs in a conventional TDD UL-DL configuration and in such case it can include less than 4 bits. An association by RRC signaling of UL TTIs in a frame in a first set of TTIs associated with a first UL PC process and in a second set of TTIs associated with a second UL PC process is sufficient in case an interfering cell uses a conventional adaptation of its TDD UL-DL configuration.

The invention additionally considers that a use of a second UL PC process is configured to the UE 114 by RRC signaling. For example, if a cell belongs in a cluster of cells using a same adaptation of a TDD UL-DL configuration and interference to a cell, in the cluster of cells, is predominantly generated by cells in the same cluster, a second UL PC process is not necessary as UL transmissions in a cell experience interference from other cells in the same cluster.

TPC Commands in DCI Format 3/3A for Use in Fixed TTIs or Flexible TTIs

In certain embodiments, TPC commands for adjusting a PUSCH transmission power or a SRS transmission power are also provided to a group of UEs through a transmission of DCI format 3/3A, with CRC scrambled with a TPC-RNTI. When separate UL PC processes are used between transmissions in a first set of UL TTIs and transmissions in a second set of UL TTIs, there is a need to identify TPC commands for each UL PC process.

In a first approach, a separate TPC-RNTI is associated with TPC commands applicable to the second set of UL TTIs and is configured to the UE 114 by higher layer signaling such as RRC signaling. Therefore, when detecting a respective PDCCH conveying a DCI format 3/3A, the UE 114 performs a CRC check after descrambling a CRC either with a first TPC-RNTI corresponding to a DCI format 3/3A providing TPC commands for a first UL PC process or with a second TPC-RNTI corresponding to a DCI format 3/3A providing TPC commands for a second UL PC process.

Figure 12:
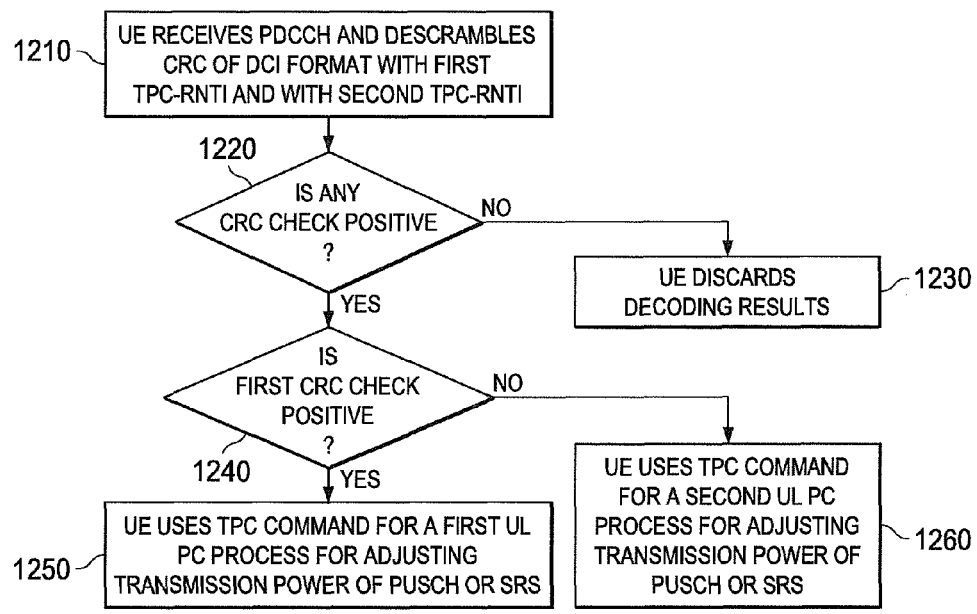
FIG. 12 illustrates an example process for a UE to obtain TPC commands for a first UL PC process and TPC commands for a second UL PC process from different respective DCI formats 3/3A according to this disclosure.

FIG. 12 illustrates an example process for the UE 114 to obtain TPC commands for a first UL PC process and TPC commands for a second UL PC process from different respective DCI formats 3/3A according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

As shown in FIG. 12, the UE 114 receives a PDCCH potentially conveying a DCI format 3/3A and descrambles its CRC using a first TPC-RNTI and using a second TPC-RNTI and performs a first respective CRC check and a second respective CRC check in operation 1210. The UE 114 subsequently examines outcomes of respective first and second CRC checks in operation 1220. If none of the CRC checks is positive, the UE 114 ignores the PDCCH decoding result in operation 1230. If the first CRC check is positive in operation 1240, the UE 114 uses a TPC command in the DCI format for a first UL CLPC process for adjusting a PUSCH or SRS transmission power in operation 1250; otherwise, the UE 114 uses a TPC command in the DCI format for a second UL CLPC process for adjusting a PUSCH or SRS transmission power in operation 1260.

In a second approach, a TPC command applicable to a first UL PC process and a TPC command applicable to a second UL PC process are provided in a same DCI format 3/3A. The UE 114 is configured (for example, by RRC signaling) a first location for a TPC command applicable to a first UL PC process and it implicitly determines a TPC command applicable to a second UL PC process to be located immediately after the TPC command applicable to the first UL PC process.

FIG. 13 illustrates an example UE determination of a TPC command for a first UL PC process and of a TPC command for a second UL PC process in a same DCI format 3/3A according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

As shown in FIG. 13, UE 114 receives a PDCCH potentially conveying a DCI format 3/3A, descrambles its CRC using a TPC-RNTI and performs a CRC check in operation 1310. The UE 114 subsequently examines an outcome of the CRC checks in operation 1320. If the CRC check is negative, the UE 114 ignores the PDCCH decoding result in operation 1330. If the CRC check is positive, the UE 114 uses a first TPC command in the DCI format for a first CLPC process for adjusting a PUSCH or a SRS transmission power in operation 1340. The UE also uses a second TPC command in the DCI format for a second CLPC process for adjusting a PUSCH or a SRS transmission power in operation 1350 wherein a location of the second TPC command is either separately configured from a location of the first TPC command or it follows immediately after a location of the first TPC command.

In addition to a DCI format 3/3A providing a TPC command for adjusting a PUSCH transmission power or a SRS transmission power in flexible TTIs, it can also be beneficial to indicate the flexible TTIs for which the transmission power adjustment is applicable (as not all flexible TTIs apply a same UL PC process). A same approach as for non-adaptive retransmission of a data TB in a PUSCH can apply.

Finally, considering that a TPC command provided by DCI format 3/3A to the UE 114 primarily intends to adjust a transmission power of periodic signaling, such as SPS PUSCH, or P-SRS, or UCI transmitted in PUCCH (other than HARQ-ACK that is in response to PDCCH detections by the UE 114 that convey DCI formats that include at least one TPC command), as a transmission power for non-periodic signaling triggered by detection of DCI formats can be adjusted from a TPC command included in a respective DCI format, supporting TPC commands by DCI format 3/3A exclusively for the second UL PC process can be avoided and the UE 114 can interpret such TPC commands as always applying either only to the first UL PC process or for both the first UL PC process and the second UL PC process.

Adjustment of UL PC Processes after Adapting a TDD UL-DL Configuration

This embodiment considers that after an adaptation of a TDD UL-DL configuration, an interference experienced by PUSCH or SRS transmissions from the UE 114 in a flexible TTI can change depending on TDD UL-DL configurations used in adjacent cells. Therefore, it may not be appropriate to continue using a same CLPC process from a previous TDD UL-DL configuration for PUSCH or SRS transmissions in flexible TTIs if the TPC commands are accumulative.

This disclosure considers that after an adaptation of a TDD UL-DL configuration, a second CLPC process, $f_{c,2}$, for PUSCH or SRS transmissions from the UE 114 in a second set of TTIs is re-initialized while a first CLPC process, $f_{c,1}$, for PUSCH or SRS transmissions from the UE 114 in a first set of TTIs continues from its latest value during a previous TDD UL-DL configuration. In order to maintain tracking of channel variations for adapting a PUSCH or SRS transmission power in a second set of TTIs associated with a second UL PC process after an adaptation of a TDD UL-DL configuration, the UE 114 re-initializes $f_{c,2}$ with a last value of $f_{c,1}$ during the previous TDD UL-DL configuration. Alternatively, prior to receiving a TPC command applicable to a current TDD UL-DL configuration, the UE 114 can re-initialize $f_{c,2}$ with the current value of $f_{c,1}$. Also, when 114 is configured to operate with a second UL PC process, an initial value for $f_{c,2}$ can be same as an existing value of $f_{c,1}$ at the time of the configuration. This can also be extended to any case where the UE 114 transitions its operation from a conventional TDD UL-DL configuration to an adapted TDD UL-DL configuration. For example, the UE 114 can initialize $f_{c,2}$ with an existing value of $f_{c,1}$ when the UE 114 fails to detect a first DCI format indicating a first adapted TDD UL-DL configuration for an adaptation period (UE 114 then operates with the conventional TDD UL-DL configuration using the first UL PC process) and the UE 114 subsequently detects a second DCI format indicating a second adapted TDD UL-DL configuration for the adaptation period. Alternatively, a configuration for use of accumulative or absolute TPC can be independent for a first CLPC process and a second CLPC process.

Figure 14:
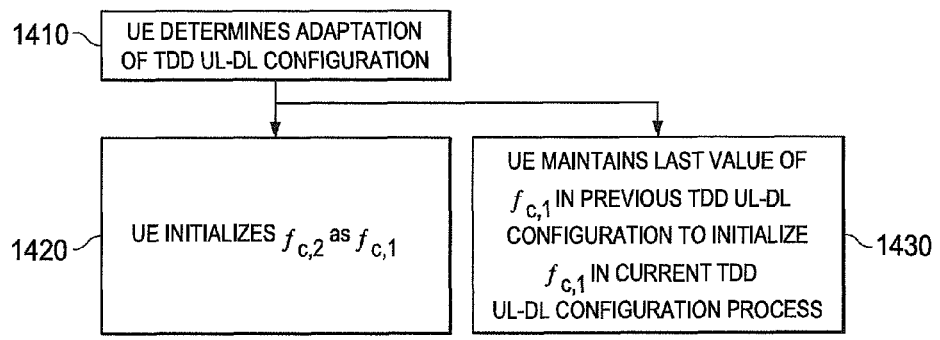
FIG. 14 illustrates an example operation of a first CLPC process and of a second CLPC process after an adaptation of a TDD UL-DL configuration according to this disclosure.

FIG. 14 illustrates an example operation of a first CLPC process and of a second CLPC process after an adaptation of a TDD UL-DL configuration according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

As shown in FIG. 14, the UE 114 determines an adaptation of a TDD UL-DL configuration in operation 1410. The UE 114 sets $f_{c,2}$ equal to a last value of $f_{c,1}$ during a previous TDD UL-DL configuration (or equal to a current value of $f_{c,1}$) in operation 1420. The UE 114 uses a last value of $f_{c,1}$ in a previous TDD UL-DL configuration to update $f_{c,1}$ in a current TDD UL-DL configuration in operation 1430.

UCI Resource Determination in Fixed TTIs and in Flexible TTIs

In certain embodiments, due to different interference characteristics a PUSCH transmission from the UE 114 can experience among fixed TTIs, such as TTI#2, and at least some flexible TTIs, and despite a possible use of different respective UL PC processes to account for the different interference, the UE 114 can operate with different respective BLERs for a transmission of data TBs. For example, interference to a PUSCH transmission from the UE 114 in some flexible TTIs can be from DL transmissions and can be much more severe than interference to a PUSCH transmission from the UE 114 in an UL fixed TTI which is always from UL transmissions.

Although a target BLER for a data TB can be adjusted to account for variations in general operating conditions, including interference conditions, a UCI target BLER is typically fixed regardless of the operating conditions. A UCI transmission in a PUCCH can be only in fixed TTIs, such as TTI#2 for the TDD UL-DL configurations in Table 2, and in that case it experiences practically stable operating conditions. However, a UCI transmission in a PUSCH, such as an aperiodic CSI transmission triggered by a PDCCH conveying a DCI format scheduling the PUSCH, can be either in a fixed TTI or in a flexible TTI. If a CSI transmission is multiplexed in a PUSCH in a flexible TTI then, depending on respective interference conditions, a respective number of REs allocated to CSI may need to be adjusted to account for a different operating BLER for data TBs in the flexible TTI relative to a fixed TTI. Since for practical reasons a power of REs in a same PUSCH symbol is same, separate power control for CSI REs and data information REs in a PUSCH is not possible. However, adjusting a number of REs used for CSI multiplexing in a PUSCH is functionally equivalent to performing UL PC for CSI separate from UL PC for data information. Additionally, even though a first UL PC process can be used for PUSCH transmissions in fixed TTIs and a second UL PC process can be used for PUSCH transmissions in at least some flexible TTIs, the second UL PC process may not be sufficient for improving a reception reliability for data TBs or for CSI as a respective UE may be power limited (already operating near maximum transmission power) or a network may choose to not significantly increase a respective transmission power to avoid creating significant interference.

To account for a different BLER of data TBs in a PUSCH between TTIs experiencing significantly different interference conditions while maintaining a same UCI BLER regardless of the TTI type, a different $\beta_{offset}^{PUSCH}$ can be used for CSI transmission in a flexible TTI than in a fixed TTI. Therefore, the UE 114 can be configured by the eNB 102 two $\beta_{offset}^{PUSCH}$ values with a first $\beta_{offset,1}^{PUSCH}$ value being used for CSI multiplexing in a PUSCH transmitted in a first set of TTIs, such as a fixed TTI or in a flexible TTI where the UE 114 experiences statistically similar interference as for a fixed TTI, and a second $\beta_{offset,2}^{PUSCH}$ value being used for CSI multiplexing in a PUSCH transmitted in a second set, such as for flexible TTIs where a PUSCH transmission experiences materially different interference than it does in a fixed TTI. Moreover, as SPS PUSCH transmissions are considered to be in a fixed TTI, the first $\beta_{offset,1}^{PUSCH}$ value is used in case a respective CSI is multiplexed in a SPS PUSCH transmission.

Figure 15:
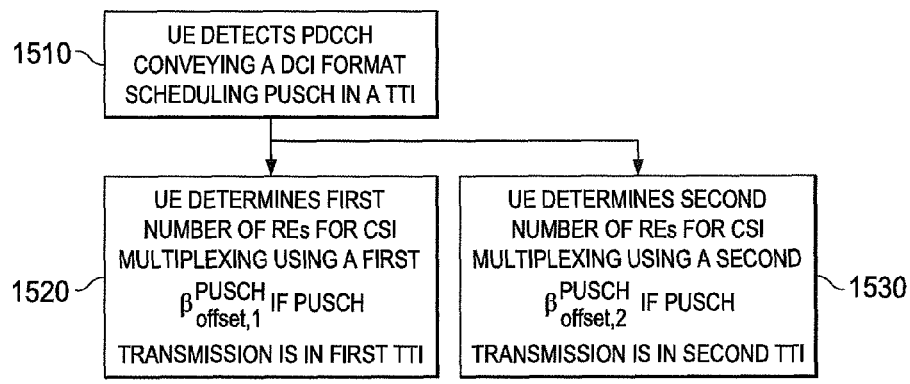
FIG. 15 illustrates an example use of a first $\beta_{offset,1}^{PUSCH}$ for determining a number of CSI resources in a first TTI and a use of a second $\beta_{offset,2}^{PUSCH}$ for determining a number of CSI resources in a second TTI according to this disclosure.

FIG. 15 illustrates an example use of a first $\beta_{offset,1}^{PUSCH}$ for determining a number of CSI resources in a first TTI and a use of a second $\beta_{offset,2}^{PUSCH}$ for determining a number of CSI resources in a second TTI according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

As shown in FIG. 15, the UE 114 detects a PDCCH conveying a DCI format scheduling a PUSCH in a TTI in operation 1510. The UE 114 multiplexes a CSI in the PUSCH by determining a respective number of REs either using a first $\beta_{offset,1}^{PUSCH}$ value in operation 1520 if the PUSCH is transmitted in a first TTI from a first set of TTIs in a frame or using a second $\beta_{offset,2}^{PUSCH}$ value in operation 1530 if the PUSCH is transmitted in a second TTI from a second set of TTIs in a frame. Therefore, $\beta_{offset,1}^{PUSCH}$ is used for CSI transmission in a PUSCH for first set of TTIs in a frame and $\beta_{offset,2}^{PUSCH}$ is used for CSI transmission in a PUSCH for second set of TTIs in a frame.

A use of a first $\beta_{offset,1}^{PUSCH}$ or of a second $\beta_{offset,2}^{PUSCH}$ in determining a number of REs for a respective CSI multiplexing in a PUSCH transmission in a TTI can be indicated to the UE 114 in a same manner as a use of a first UL PC process or of a second UL PC process for a PUSCH transmission, as it was previously described (configuration by RRC signaling or dynamic indication by a DCI format). Furthermore, a use of a first $\beta_{offset,1}^{PUSCH}$ can be directly linked with a use of a first UL PC process while a use of a second $\beta_{offset,2}^{PUSCH}$ can be directly linked with a use of a second UL PC process (a first set of TTIs in a frame is configured to use a first UL PC process and a first $\beta_{offset}^{PUSCH}$ and a second set of TTIs in a frame is configured to use a first UL PC process and a second $\beta_{offset}^{PUSCH}$).

Link Adaptation for Retransmissions of Data Transport Blocks

In certain embodiments, similar to link adaptation of UCI transmissions in a PUSCH that can experience different interference characteristics between a fixed TTI and at least one flexible TTI, such link adaptation can also be beneficial for transmissions of data TBs. As previously discussed, a use of separate UL PC processes for UL signaling from a UE 114 in TTIs with UL dominant interference and in TTIs with DL dominant interference can improve a reception reliability in TTIs where interference is primarily from DL transmissions to other UEs but it can often be difficult (for example, due to UE transmit power limitations or due to limitations in additional UL interference) to provide a comparable reception reliability as in TTIs where interference is primarily from UL transmissions from other UEs.

Regardless of whether a retransmission of a data TB in a PUSCH is adaptive (triggered by a detection of a respective PDCCH) or non-adaptive (triggered by a detection of a NACK value in a respective HARQ-ACK signal), a same Modulation and Coding Scheme (MCS) index $I_{MCS}$ is used as for a respective initial transmission of the data TB and only a Redundancy Version (RV) for a HARQ process using Incremental Redundancy (IR) is updated. Although keeping a same MCS is appropriate when a retransmission of a data TB experiences statistically a same interference as an initial transmission of the data TB, this can be detrimental when the interference is significantly different between the two transmissions.

In a first approach, when a PUSCH conveying an initial transmission of a data TB is transmitted in a fixed TTI or in a flexible TTI where a respective UE experiences dominant interference from UL transmissions from other UEs, and a PUSCH conveying a retransmission of a same data TB is transmitted in a flexible TTI where a respective UE experiences dominant interference from DL transmissions to other UEs, it can be beneficial for the MCS used in the retransmission of the data TB to be lower than the MCS used for the initial transmission of the same data TB. This can provide a comparable reliability for values of demodulated data bits (prior to decoding) as for the initial transmission of the data TB and enable proper combining of respective values prior to data TB decoding. Conversely, when a PUSCH conveying an initial transmission of a data TB is transmitted in a flexible TTI where a respective UE experiences dominant interference from DL transmissions to other UEs and a PUSCH conveying a retransmission of a same data TB is transmitted in a fixed TTI or in a flexible TTI where a respective UE experiences dominant interference from UL transmissions from other UEs, it can be beneficial for the MCS used for the retransmission of the data TB to be higher than the MCS used for the initial transmission of the same data TB.

The present disclosure considers that the eNB 102 configures the UE 114 with a MCS index shift $I_{MCS\_shift}$ that the UE 114 can apply in determining an MCS index for a retransmission of a data TB. If an interference in a TTI conveying a retransmission of a data TB in a PUSCH is statistically different than an interference in a TTI conveying an initial transmission of the same data TB in a PUSCH, and denoting by $I_{MCS\_initial}$ an MCS index for the initial transmission of the data TB, the UE 114 determines an MCS index $I_{MCS\_retransmission}$ for the retransmission of the data TB as $I_{MCS\_retransmission} = \max(I_{MCS\_initial} - I_{MCS\_shift}, I_{MCS\_min})$ if a TTI of the initial transmission is of a same type as a TTI of a first UL PC process and a TTI of the retransmission if of a same type as a TTI of a second UL PC process. Otherwise, if a TTI of the initial transmission is of a same type as a TTI of a second UL PC process and a TTI of the retransmission if of a same type as a TTI of a first UL PC process, $I_{MCS\_retransmission} = \min(I_{MCS\_initial} + I_{MCS\_shift}, I_{MCS\_max})$. $I_{MCS\_min}$ and $I_{MCS\_max}$ are respectively the minimum and maximum MCS indexes supported for the UE 114 operation. The association of a TTI type to an UL PC process is with respect to previously described determination methods for using a first UL PC process (TTI is in a first set) or a second UL PC process (TTI is in a second set) and is independent of whether more than one UL PC processes are actually used. Conversely, if an interference in a TTI conveying a retransmission of a data TB in a PUSCH is statistically same as an interference in a TTI conveying an initial transmission of the same data TB in a PUSCH, an MCS shift is not used. Then, $I_{MCS\_retransmission} = I_{MCS\_initial}$.

Figure 16:
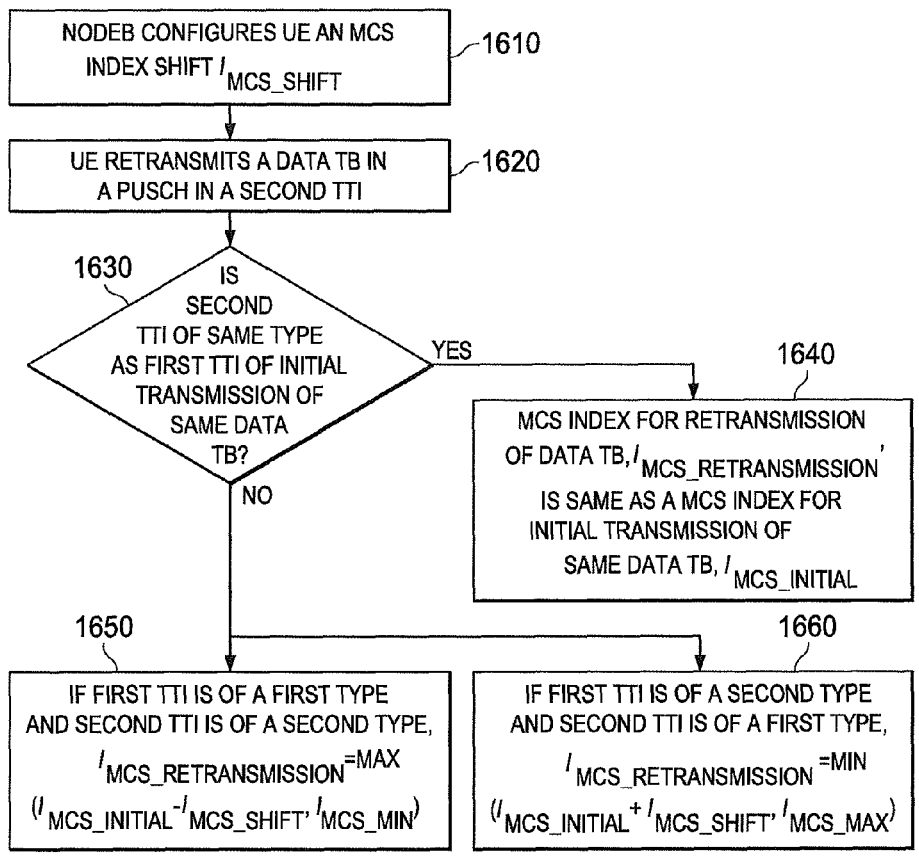
FIG. 16 illustrates an example use of a MCS index shift $I_{MCS\_shift}$ for a UE to determine a MCS index for a retransmission of a data TB according to this disclosure.

FIG. 16 illustrates an example use of a MCS index shift $I_{MCS\_shift}$ for UE 114 to determine a MCS index for a retransmission of a data TB according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

As shown in FIG. 16, the eNB 102 configures, using higher layer signaling, a MCS index shift $I_{MCS\_shift}$ to the UE 114 1610. For a retransmission of a data TB in a PUSCH in a second TTI in operation 1620, the UE 114 determines whether the second TTI is of a same type as a first TTI for an initial transmission of the same data TB in a respective PUSCH in operation 1630. A TTI can be of a first type or of a second type and a respective determination can be as previously described for the UE 114 to determine whether to apply a first UL PC process or a second UL PC process for a respective PUSCH transmission. If the first TTI and the second TTI are of a same type, the UE 114 determines a MCS index for a retransmission of a data TB, $I_{MCS\_retransmission}$, to be same as a MCS index for an initial transmission of the same data TB, $I_{MCS\_initial}$ 1640. If the first TTI and the second TTI are not of a same type, the UE 114 determines a MCS index for a retransmission of a data TB as $I_{MCS\_retransmission}$=max$(I_{MCS\_initial}-I_{MCS\_shift},I_{MCS\_min})$ if the first TTI is of a first type and the second TTI is of a second type in operation 1650 or as $I_{MCS\_retransmission}$=min$(I_{MCS\_initial}+I_{MCS\_shift},I_{MCS\_max})$ if the first TTI is of a second type and the second TTI is of a first type in operation 1660.

In a second approach, a same MCS can be used for an initial transmission and for a retransmission of a same data TB but the eNB 102 can scale differently, before combining for data TB decoding, values of demodulated data bits it receives in a TTI where the UE 114 experiences UL-dominant interference and applies a first UL PC process and values of demodulated data bits it receives in a TTI where the UE 114 experiences DL-dominant interference and applies a second UL PC process. This allows obtaining a functionally similar operation as applying an MCS shift, as it was previously discussed but, instead of applying such an adjustment at the UE 114 transmission for a retransmission of a data TB, a similar adjustment is applied at the eNB 102 reception for a retransmission of a data TB.

Figure 17:
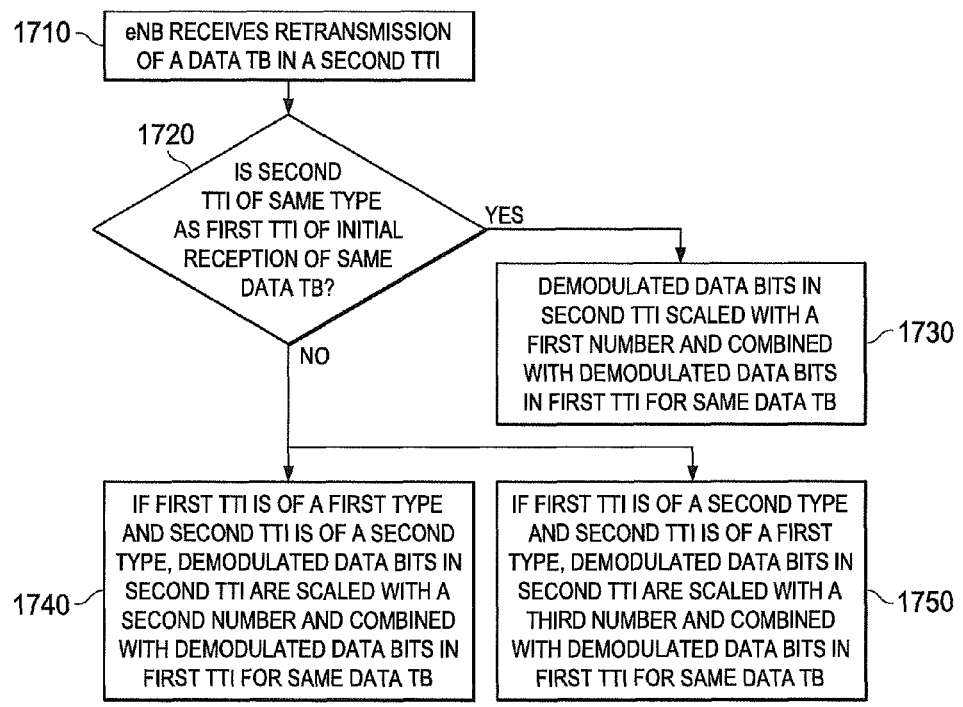
FIG. 17 illustrates an example scaling of demodulated values for data information bits from a retransmission of a data TB before combining with demodulated values for data information bits from an initial transmission of a same data TB prior to decoding according to this disclosure.

FIG. 17 illustrates an example scaling of demodulated values for data information bits from a retransmission of a data TB before combining with demodulated values for data information bits from an initial transmission of a same data TB prior to decoding according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

As shown in FIG. 17, the eNB 102 receives a retransmission of a data TB in a second TTI in operation 1710 and considers whether the second TTI is of a same type as a first TTI where the eNB 102 receives an initial transmission of the same data TB in operation 1720. If it is, demodulated data bits corresponding to encoded data information bits received in the second TTI are scaled with a first number before being combined with demodulated data bits corresponding to encoded data information bits received in the first TTI prior to decoding in operation 1730. For example, the first number can be equal to one and demodulated data bits are combined with their actual values that capture a respective SINR. If it is not, and the first TTI is of a first type and the second TTI is of a second type, demodulated data bits corresponding to encoded data information bits received in the second TTI are scaled with a second number before being combined with demodulated data bits corresponding to encoded data information bits received in the first TTI prior to decoding in operation 1740. For example, the second number can be smaller than one. If it is not, and the first TTI is of a second type and the second TTI is of a first type, demodulated data bits corresponding to encoded data information bits received in the second TTI are scaled with a third number before being combined with demodulated data bits corresponding to encoded data information bits received in the first TTI prior to decoding in operation 1750. For example, the third number can be larger than one. Similar to a use of an MCS shift, such scaling is particularly applicable if the second UL PC process cannot fully compensate for the DL-dominant interference in the second set of UL TTIs due to limitations in UL transmission power from a UE 114 either because additional power is unavailable or because it is beneficial to avoid increasing interference to other cells.

Although the present disclosure has been described with an exemplary embodiment, various changes and modifications may be suggested to one skilled in the art. It is intended that the present disclosure encompass such changes and modifications as fall within the scope of the appended claims.

What is claimed is:
1. A method comprising:
    transmitting, by a base station to a User Equipment (UE):
        first signaling indicating a first Time Division Duplexing (TDD) UpLink-DownLink (UL-DL) configuration, from a set of TDD UL-DL configurations, wherein a TDD UL-DL configuration is defined over a time period of ten SubFrames (SFs) that comprise DL SFs where a communication direction is from the base station to the UE, UL SFs where a communication direction is from the UE to the base station, and special SFs where a communication direction can be both from the base station to the UE and from the UE to the base station, and wherein each SF of the ten SFs has a unique time domain index;
        first configuration information for communication using adapted TDD UL-DL configurations, wherein a valid adapted TDD UL-DL configuration is from a subset of the set of TDD UL-DL configurations, wherein a number of UL or special SFs in the first TDD UL-DL configuration are DL SFs in an adapted TDD UL-DL configuration, and wherein at least one UL SF in the first TDD UL-DL configuration remains UL SF in any TDD UL-DL configuration from the subset of the set of TDD UL-DL configurations;
        second configuration information for:
            a first set of parameters associated with a first UL Power Control (PC) process,
            a second set of parameters associated with a second UL PC process, and
            a bit-map defining a one-to-one mapping between a subset of predetermined SFs, in any TDD UL-DL configuration from the set of TDD UL-DL configurations, and a first set of SFs and a second set of SFs, wherein a binary value of '0' associates a SF with the first set of SFs and a binary value of '1' associates a SF with the second set of SFs, and wherein the first set of SFs includes all SFs that are UL SFs in every TDD UL-DL configuration from the subset of the set of TDD UL-DL configurations and the second set of SFs includes at least one SF that is a DL SF in at least one TDD UL-DL configuration from the subset of the set of TDD UL-DL configurations; and
        second signaling indicating the UE to transmit a Physical UL Shared CHannel (PUSCH) or a Sounding Reference Signal (SRS) in an UL SF of the adapted TDD UL-DL configuration;
    wherein in response to receiving the first signaling, the first configuration information, the second configuration information, and the second signaling, the UE transmits the PUSCH or SRS in the UL SF with a power determined according to the first UL PC process if the UL SF is in the first set of SFs or with a power determined according to the second UL PC process if the UL SF is in the second set of SFs.

2. The method of claim 1, wherein if the UL SF is an UL SF configured to the UE to transmit a Physical UL Control CHannel or a semi-persistently scheduled PUSCH, the power is determined according to the first UL PC process.

3. The method of claim 2, wherein the first UL PC process is same as the UL PC process for a UE that is not configured for communication using adapted TDD UL-DL configurations.

4. The method of claim 1, wherein the set of TDD UL-DL configurations includes the TDD UL-DL configurations of Table 1, the bit-map includes 6 binary elements, and the subset of predetermined SFs includes SF#3, SF#4, SF#6, SF#7, SF#8, and SF#9.

5. The method of claim 1, wherein the configuration information further includes a first value, $\beta_{offset,1}^{PUSCH}$, for an offset and a second value, $\beta_{offset,2}^{PUSCH}$, for the offset, wherein the first value and the second value are associated, respectively, with the first set of SFs and the second set of SFs, and the UE or the base station determines a number of resource elements for multiplexing a Channel State Information (CSI) in the PUSCH using the offset value.

6. The method of claim 1, wherein the first set of SFs further includes an SF that is a DL SF in a TDD UL-DL configuration from the subset of the set of TDD UL-DL configurations.

7. The method of claim 1, wherein the DCI format includes a binary field, wherein a binary value of '0' sets the association of the UL SF to the first set of SFs and a binary value of '1' sets the association of the UL SF to the second set of SFs.

8. The method of claim 1, wherein the first set of SFs and the second set of SFs for the UE are different than the first set of SFs and the second set of SFs for another UE.

9. The method of claim 1, wherein the first UL PC process includes a first closed-loop UL PC process and the second UL PC process includes a second closed-loop UL PC process, wherein prior to receiving the second configuration information the UE transmits PUSCH or SRS using only the first UL PC process, and wherein upon activating the second configuration information the UE initializes the second closed-loop UL PC process with the current value of the first closed-loop UL PC process.

10. A base station comprising:
a transmitter configured to transmit, to a User Equipment (UE):
first signaling indicating a first Time Division Duplexing (TDD) UpLink-DownLink (UL-DL) configuration, from a set of TDD UL-DL configurations, wherein a TDD UL-DL configuration is defined over a time period of ten SubFrames (SFs) that comprise DL SFs where a communication direction is from the base station to the UE, UL SFs where a communication direction is from the UE to the base station, and special SFs where a communication direction can be both from the base station to the UE and from the UE to the base station, and wherein each SF of the ten SFs has a unique time domain index;
first configuration information for communication using adapted TDD UL-DL configurations, wherein a valid adapted TDD UL-DL configuration is from a subset of the set of TDD UL-DL configurations, wherein a number of UL or special SFs in the first TDD UL-DL configuration are DL SFs in an adapted TDD UL-DL configuration and wherein at least one UL SF in the first TDD UL-DL configuration remains UL SF in any TDD UL-DL configuration from the subset of the set of TDD UL-DL configurations;
second configuration information for:
a first set of parameters associated with a first UL Power Control (PC) process
a second set of parameters associated with a second UL PC process, and
a bit-map defining a one-to-one mapping between a subset of predetermined SFs, in any TDD UL-DL configuration from the set of TDD UL-DL configurations, and a first set of SFs and a second set of SFs, wherein a binary value of '0' associates a SF with the first set of SFs and a binary value of '1' associates a SF with the second set of SFs, and wherein the first set of SFs includes all SFs that are UL SFs in every TDD UL-DL configuration from the subset of the set of TDD UL-DL configurations and the second set of SFs includes at least one SF that is a DL SF in at least one TDD UL-DL configuration from the subset of the set of TDD UL-DL configurations; and
second signaling indicating the UE to transmit a Physical UL Shared CHannel (PUSCH) or a Sounding Reference Signal (SRS) in an UL SF of the adapted TDD UL-DL configuration, wherein the UE transmits the PUSCH or SRS in the UL SF with a power determined according to the first UL PC process if the UL SF is in the first set of SFs or with a power determined according to the second UL PC process if the UL SF is in the second set of SFs; and
a receiver configured to receive the PUSCH or the SRS.

11. The apparatus of claim 10, wherein if the UL SF is an UL SF configured to the UE to transmit a Physical UL Control CHannel or a semi-persistently scheduled PUSCH, the power is determined according to the first UL PC process.

12. The apparatus of claim 10, wherein the configuration information further includes a first value, $\beta_{offset,1}^{PUSCH}$, for an offset and a second value, $\beta_{offset,2}^{PUSCH}$, for the offset, wherein the first value and the second value are associated, respectively, with the first set of SFs and the second set of SFs, and the apparatus determines a number of resource elements for multiplexing a Channel State Information (CSI) in the PUSCH using the offset value.

13. A User Equipment (UE) comprising:
a receiver configured to receive, from a base station:
first signaling indicating a first Time Division Duplexing (TDD) UpLink-DownLink (UL-DL) configuration, from a set of TDD UL-DL configurations, wherein a TDD UL-DL configuration is defined over a time period of ten SubFrames (SFs) that comprise DL SFs where a communication direction is from the base station to the UE, UL SFs where a communication direction is from the UE to the base station, and special SFs where a communication direction can be both from the base station to the UE and from the UE to the base station, and wherein each SF of the ten SFs has a unique time domain index;
first configuration information for communication using adapted TDD UL-DL configurations, wherein a valid adapted TDD UL-DL configuration is from a subset of the set of TDD UL-DL configurations, wherein a number of UL or special SFs in the first TDD UL-DL configuration are DL SFs in an adapted TDD UL-DL configuration and wherein at least one UL SF in the first TDD UL-DL configuration remains UL SF in any TDD UL-DL configuration from the subset of the set of TDD UL-DL configurations;

second configuration information for:
- a first set of parameters associated with a first UL Power Control (PC) process
- a second set of parameters associated with a second UL PC process, and
- a bit-map defining a one-to-one mapping between a subset of predetermined SFs, in any TDD UL-DL configuration from the set of TDD UL-DL configurations, and a first set of SFs and a second set of SFs, wherein a binary value of '0' associates a SF with the first set of SFs and a binary value of '1' associates a SF with the second set of SFs, and wherein the first set of SFs includes all SFs that are UL SFs in every TDD UL-DL configuration from the subset of the set of TDD UL-DL configurations and the second set of SFs includes at least one SF that is a DL SF in at least one TDD UL-DL configuration from the subset of the set of TDD UL-DL configurations; and second signaling indicating the UE to transmit a Physical UL Shared CHannel (PUSCH) or a Sounding Reference Signal (SRS) in an UL SF of the adapted TDD UL-DL configuration; and a transmitter configured to transmit the PUSCH or the SRS in the UL SF with a power determined according to the first UL PC process if the UL SF is in the first set of SFs or with a power determined according to the second UL PC process if the UL SF is in the second set of SFs.

14. The apparatus of claim 13, wherein if the UL SF is an UL SF configured to the UE to transmit a Physical UL Control CHannel or a semi-persistently scheduled PUSCH, the power is determined according to the first UL PC process.

15. The apparatus of claim 13, wherein the configuration information further includes a first value, $\beta_{offset,1}^{PUSCH}$, for an offset and a second value, $\beta_{offset,2}^{PUSCH}$, for the offset, wherein the first value and the second value are associated, respectively, with the first set of SFs and the second set of SFs, and the apparatus determines a number of resource elements for multiplexing a Channel State Information (CSI) in the PUSCH using the offset value.

* * * * *